United States Patent
Shibaike

(10) Patent No.: US 11,208,092 B2
(45) Date of Patent: Dec. 28, 2021

(54) POWERTRAIN SYSTEM

(71) Applicant: Toyota Jidosha Kabushiki Kaisha, Toyota (JP)

(72) Inventor: Yushi Shibaike, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 16/689,439

(22) Filed: Nov. 20, 2019

(65) Prior Publication Data
US 2020/0164858 A1 May 28, 2020

(30) Foreign Application Priority Data

Nov. 22, 2018 (JP) .............................. JP2018-219556
Feb. 14, 2019 (JP) .............................. JP2019-024833

(51) Int. Cl.
*B60W 20/11* (2016.01)

(52) U.S. Cl.
CPC .................................. *B60W 20/11* (2016.01)

(58) Field of Classification Search
CPC ...... B60W 20/11; B60W 10/06; B60W 10/08; B60W 2710/083; B60W 2710/0666; B60W 10/26; B60W 10/11; B60W 20/10; B60W 2510/0638; B60W 2510/0657; B60W 2520/10; B60W 2510/083; B60K 6/445; Y02T 10/62
See application file for complete search history.

(56) References Cited

U.S. PATENT DOCUMENTS

| 8,138,703 | B2 * | 3/2012 | Heap | B60K 6/36 318/432 |
| 2009/0118943 | A1 * | 5/2009 | Heap | B60W 10/115 701/54 |
| 2010/0138077 | A1 | 6/2010 | Kawai | |
| 2014/0046519 | A1 * | 2/2014 | Diaz | B60W 10/08 701/22 |

FOREIGN PATENT DOCUMENTS

JP 2009-047099 A 3/2009

* cited by examiner

*Primary Examiner* — Brian P Sweeney
(74) *Attorney, Agent, or Firm* — Dinsmore & Shohl LLP

(57) ABSTRACT

A powertrain system includes one or more torque devices associated with the control of the driving force of a vehicle, and a control device configured to control the one or more torque devices. The control device is configured to act as: a first manipulated variable determination section that solves a linear programming problem to determine, based on one or more linear state equations that define a relationship between one or more state quantities controlled by the powertrain system and one or more manipulated variables of the one or more torque devices, the one or more manipulated variables such that one or more target state quantities are maximally achieved within one or more constraints of the powertrain system; and a torque device control section that controls the one or more torque devices in accordance with the one or more manipulated variables determined by the first manipulated variable determination section.

10 Claims, 15 Drawing Sheets

POWERTRAIN SYSTEM

CROSS-REFERENCE TO RELATED APPLICATION

The present disclosure claims priority under 35 U.S.C. § 119 to Japanese Patent Applications No. 2018-219556, filed on Nov. 22, 2018, and No. 2019-024833, filed on Feb. 14, 2019. The contents of these applications are incorporated herein by reference in their entirety.

BACKGROUND

Technical Field

The present disclosure relates to a powertrain system, and more particularly to a powertrain system provided with at least one torque device associated with the control of driving force of a vehicle.

Background Art

For example, JP 2009-047099 A discloses a vehicle control device. According to this vehicle control device, requests are outputted to a plurality of kinds of control parameters of the vehicle from each of a plurality of control logics having individual purposes. The control parameters mentioned here are, for example, torque and air-fuel ratio of an internal combustion engine, and the individual purposes are, for example, to reduce exhaust gas emission and fuel consumption.

In the vehicle control device, the outputted requests are arbitrated for every kind of control parameter, and as a result, target values of the respective control parameters are determined. In addition, information on the priority order among the requests described above is also outputted from the individual control logics. As a result, according to vehicle control device described above, when determining the target values of the respective control parameters, the requests from the plurality of control logics are arbitrated on the basis of the outputted priory order.

SUMMARY

A powertrain system is known which includes one or more torque devices (for example, internal combustion engine and motor generator) associated with the control of the driving force of a vehicle. In this kind of powertrain system, it is desirable to determine one or more manipulated variables (for example, engine torque and electric motor torque) of the one or more torque devices so as to maximally achieve one or more target state quantities of one or more state quantities (for example, vehicle driving torque and charge/discharge amount of a battery) that are to be controlled.

In this context, the one or more state quantities and the one or more manipulated variables of the powertrain system have various constraints. Therefore, it is desirable to be able to determine the one or more manipulated variables such that the one or more target state quantities are maximally achieved within this kind of constraints. It is also desirable that a control structure serving as a basis of a torque device control that is to be constructed have a versatility which can be easily applied to other powertrain systems of different configurations.

The present disclosure has been made in view of the issue described above, and an object of the present disclosure is to provide a powertrain system that can determine one or more manipulated variables of one or more torque devices so as to maximally achieve one or more target state quantities while satisfying one or more constraints, and that can construct a highly versatile control structure (control platform).

A powertrain system according to the present disclosure includes: one or more torque devices associated with control of a driving force of a vehicle; and a control device configured to control the one or more torque devices. The control device is configured to act as: a first manipulated variable determination section that solves a linear programming problem to determine, based on one or more linear state equations that define a relationship between one or more state quantities controlled by the powertrain system and one or more manipulated variables of the one or more torque devices, the one or more manipulated variables such that one or more target state quantities being one or me target values of the one or more state quantities are maximally achieved within one or more constraints of the powertrain system; and a torque device control section that controls the one or more torque devices in accordance with the one or more manipulated variables determined by the first manipulated variable determination section.

The one or more target state quantities may include a plurality of target state quantities. The first manipulated variable determination section may be further configured to solve the linear programming problem to determine, within the one or more constraints, the one or more manipulated variables that maximally achieve each of the plurality of target state quantities in descending order of priority.

The one or more torque devices may include a first torque device and a second torque device having a greater output response delay compared to the first torque device. The control device may be further configured to act as: a predicted manipulated variable calculation section that calculates a predicted manipulated variable of the second torque device that is obtained by reflecting an output response delay of the second torque device into a manipulated variable of the second torque device determined by the first manipulated variable determination section; and a second manipulated variable determination section that solves the linear programming problem to determine, based on the one or more state equations in which the predicted manipulated variable is substituted as the manipulated variable of the second torque device, a manipulated variable of the first torque device that maximally achieves the one or more target state quantities within the one or more constraints. The torque device control section may also control the second torque device in accordance with the manipulated variable of the second torque device determined by the first manipulated variable determination section, and control the first torque device in accordance with the manipulated variable of the first torque device determined by the second manipulated variable determination section.

The one or more target state quantities may include a plurality of target state quantities. The second manipulated variable determination section may solve the linear programming problem to determine, within the one or more constraints, the manipulated variable of the first torque device that maximally achieves each of the plurality of target state quantities in descending order of priority.

The one or more constraints may include a plurality of constraints concerning the one or more state quantities. When the one or more manipulated variables are unable to be determined while complying with the plurality of constraints, the first manipulated variable determination section may determine the one or more manipulated variables while relaxing at least one of the plurality of constraints in ascending order of priority.

The plurality of constraints may include: one or more first constraints concerning the one or more target state quantities; and one or more second constraints concerning at least one of upper limit constraint value and lower limit constraint value of the one or more state quantities. The priority given to the one or more second constraints may be higher than the priority given to the one or more first constraints.

The plurality of constraints may include a plurality of second constraints concerning at least one of upper limit constraint value and lower limit constraint value of the one or more state quantities. In relaxing the plurality of second constraints when the one or more manipulated variables are unable to be determined while complying with the plurality of constraints, the first manipulated variable determination section may relax the plurality of second constraints while minimizing an excess amount with respect to the upper limit constraint value or the lower limit constraint value associated with each of the plurality of second constraints in descending order of the priority.

The one or more constraints may include a plurality of constraints concerning the one or more state quantities. When the one or more manipulated variables are unable to be determined while complying with the plurality of constraints, the second manipulated variable determination section may determine the one or more manipulated variables while relaxing at least one of the plurality of constraints in ascending order of priority.

The plurality of constraints may include: one or more first constraints concerning the one or more target state quantities; and one or more second constraints concerning at least one of upper limit constraint value and lower limit constraint value of the one or more state quantities. The priority given to the one or more second constraints may be higher than the priority given to the one or more first constraints.

The plurality of constraints may include a plurality of second constraints concerning at least one of upper limit constraint value and lower limit constraint value of the one or more state quantities. In relaxing the plurality of second constraints when the one or more manipulated variables are unable to be determined while complying with the plurality of constraints, the second manipulated variable determination section may relax the plurality of second constraints while minimizing an excess amount with respect to the upper limit constraint value or lower limit constraint value corresponding to each of the plurality of second constraints in descending order of the priority.

According to the powertrain system of the present disclosure, by a linear programming problem on the basis of one or more linear state equations that define a relationship between one or more state quantities controlled by the powertrain system and one or more manipulated variables of one or more torque devices, the one or more manipulated variables can be determined such that one or more target state quantities are maximally achieved within one or more constraints. Then, the one or more torque devices can be controlled in accordance with the determined one or more manipulated variables.

Furthermore, according to the powertrain system of the present disclosure, the one or more linear state equations are used to define the relationship between the one or more state quantities (one or more control variables) and the one or more manipulated variables in the driveline of the powertrain system. The state equations of the driveline of the powertrain system is linear without depending on the system configuration. Therefore, it is possible to construct a highly versatile control structure that can be easily applied to other powertrain systems including one or more desired torque devices, by properly changing the type and number of the state quantity and manipulated variable substituted into the one or more state equations.

DETAILED DESCRIPTION

Figure 1:
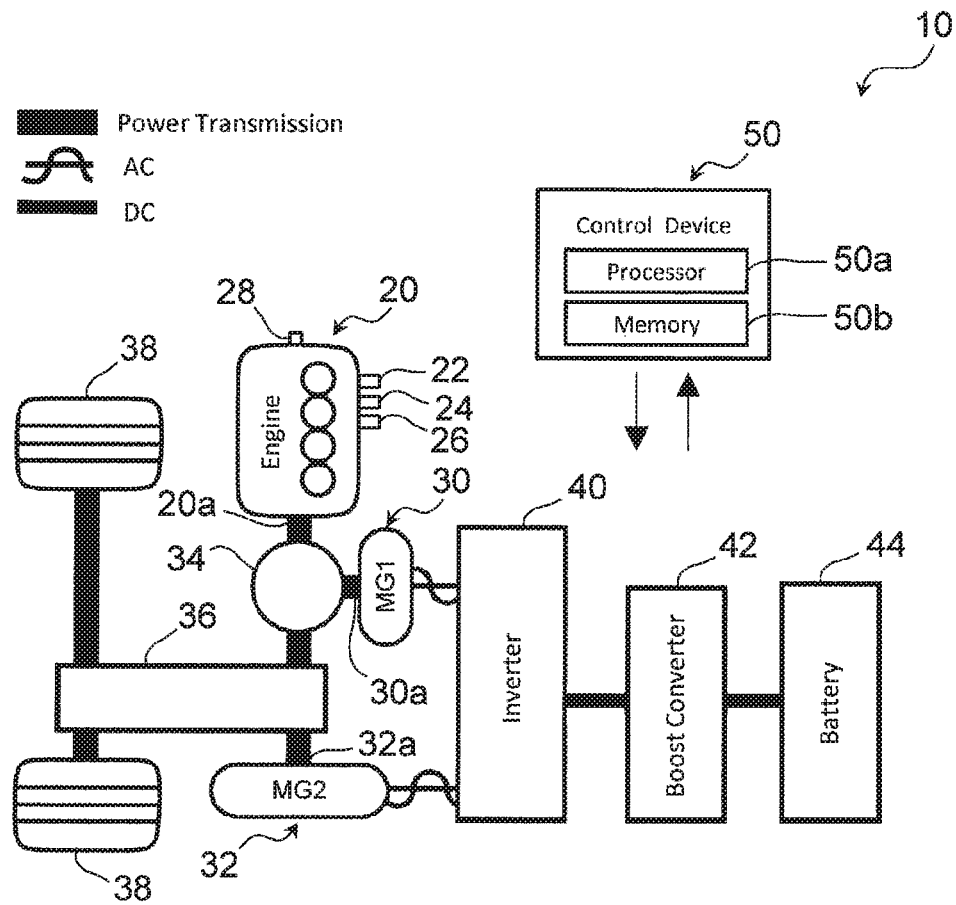
FIG. 1 is a schematic diagram that illustrates an example of the configuration of a powertrain system according to a first embodiment of the present disclosure.

In the following, embodiments of the present disclosure will be described with reference to the accompanying drawings. However, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily to the present disclosure unless explicitly shown otherwise, or unless the present disclosure is explicitly specified by the structures, steps or the like theoretically.

1. First Embodiment

A first embodiment according to the present disclosure will be described with reference to FIGS. 1 to 5.

1-1. Example of Configuration of Powertrain System

FIG. 1 is a schematic diagram that illustrates an example of the configuration of a powertrain system 10 according to the first embodiment of the present disclosure. The powertrain system 10 shown in FIG. 1 is provided with a first motor generator (hereunder, abbreviated as "MG1") 30 and a second motor generator (hereunder, abbreviated as "MG2") 32 as well as an internal combustion engine 20, as power sources of a vehicle. That is to say, the powertrain system 10 is applied to a hybrid vehicle as an example.

As an example, the internal combustion engine 20 is a spark ignition engine. However, an internal combustion engine according to the present disclosure may alternatively be a compression ignition engine, and the number and arrangement of cylinders thereof are not particularly limited. As actuators for controlling engine torque Te, the internal combustion engine 20 is equipped with a throttle valve 22, fuel injection valves 24 and an ignition device 26. The throttle valve 22 is arranged in an intake air passage (not shown) and controls intake air flow rate. Each of the fuel injection valves 24 is arranged for its corresponding cylinder, and injects fuel, for example, directly into its corresponding cylinder. The ignition device 26 ignites an air-fuel mixture in each cylinder by the use of a spark plug arranged for each cylinder. In addition, the internal combustion engine 20 is provided with various sensors used in various engine controls. The various sensors mentioned here include a crank angle sensor 28 that outputs a signal responsive to crank angle.

The MG1 30 and the MG2 32 are both electric motors that can generate electric power. That is to say, the MG1 30 and the MG2 32 are, for example, alternate current synchronous motor generators having both a function as an electric motor that outputs a torque using a supplied electric power and a function as a generator that transduces an inputted mechanical power into the electric power. According to the powertrain system 10 shown in FIG. 1, the MG1 30 is mainly used as a generator, and the MG2 32 is mainly used as an electric motor for driving the vehicle.

The internal combustion engine 20, the MG1 30 and the MG2 32 are coupled to wheels 38 via a power split device 34 and a speed reducer 36. The power split device 34 is, for example, a planetary gear unit and splits the engine torque Te outputted from the internal combustion engine 20 into the MG1 30 and the wheels 38. To be more specific, in the power split device 34: a sun gear is coupled to an output shaft 30a of the MG1 30; a planetary carrier is coupled to a crankshaft 20a of the internal combustion engine 20; and a ring gear is coupled to an output shaft 32a of the MG2 32. The engine torque Te outputted from the internal combustion engine 20 or MG2 torque Tm outputted from the MG2 32 is transmitted to the wheels 38 via the speed reducer 36. That is to say, the internal combustion engine 20 and the MG2 32 generate the driving force of the vehicle and control the driving force of the vehicle. The MG1 30 can regenerate electric power using the engine torque Te supplied from the internal combustion engine 20 via the power split device 34. Because of this, the MG1 30 is also used to control the driving force of the vehicle. In addition, the MG2 32 functions as a generator during the braking of the vehicle, and recovers the kinetic energy of the vehicle to convert it to electric power.

The MG1 30 and the MG2 32 each exchange electric power with a battery 44 via an inverter 40 and a boost converter 42. The inverter 40 is configured to convert the electric power stored in the battery 44 from direct current (DC) to alternating current (AC) to supply this AC electric power to the MG2 32, and to convert the electric power generated by the MG1 30 and the MG2 32 from AC to DC to store this DC electric power in the battery 44. Because of this, the battery 44 is charged with the electric power generated by the MG1 30 and the MG2 32, and the electric power stored in the battery 44 is discharged when it is consumed by the MG2 32. The boost converter 42 boosts the voltage of the battery 44 as necessary.

The powertrain system 10 according to the present embodiment is further provided with a control device 50 for controlling the powertrain (the internal combustion engine 20, the MG1 30 and the MG2 32). The control device 50 is an electronic control unit (ECU) that includes a processor 50a and a memory 50b. The memory 50b stores programs for controlling the powertrain system 10. The processor 50a reads out a program from the memory 50b to execute the program. The control device 50 receives sensor signals from various sensors for controlling the powertrain. Moreover, the processor 50a executes various programs using the received sensor signals and outputs actuating signals for operating various actuators of the powertrain.

The control device 50 is electrically connected to the various sensors used for the control of the powertrain, such as an accelerator position sensor, a brake position sensor and a vehicle speed sensor in addition to the aforementioned various sensors for the engine controls, such as the crank angle sensor 28. The control device 50 can calculate an engine speed Ne by the use of the signals of the crank angle sensor 28.

Furthermore, the control device 50 is electrically connected to the various actuators for controlling the powertrain including the internal combustion engine 20 (the throttle valve 22, the fuel injection valves 24 and the ignition device 26), the MG1 30 and the MG2 32. It should be noted that the internal combustion engine 20, the MG1 30 and the MG2 32 correspond to an example of "one or more torque devices associated with control of driving force of a vehicle" according to the present disclosure. In addition, the control device 50 may alternatively be configured with a plurality of ECUs.

Figure 2:
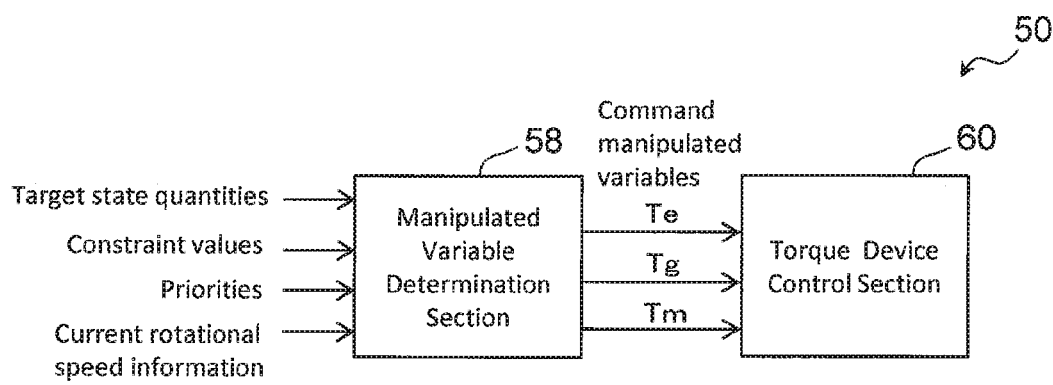
FIG. 2 is a block diagram that illustrates a functional configuration of a control device that is related to a torque device control according to the first embodiment of the present disclosure.

1-2. Torque Device Control According to First Embodiment 1-2-1. Outline of Torque Device Control As described above, the internal combustion engine 20, the MG1 30 and the MG2 32 correspond to the torque devices included in the powertrain system 10. FIG. 2 is a block diagram that illustrates a functional configuration of the control device 50 that is related to a torque device control according to the first embodiment of the present disclosure. The control device 50 includes a "manipulated variable determination section 58" and a "torque device control section 60" in order to perform the torque device control.

As an example, state quantities controlled by the powertrain system 10 (i.e., control variables) in the present embodiment are a driving torque Tp, a charge/discharge amount Pchg and a rotational speed change rate dNg. The driving torque Tp denotes the driving torque (Nm) of the wheels 38 correlated with the vehicle driving force. The charge/discharge amount Pchg denotes the charge/discharge amount (W) of the battery 44, and is herein assumed to become negative during charging and become positive during discharging. The rotational speed change rate dNg denotes the rotational speed change rate (Rad/s$^2$) of the MG1 30.

It should be noted that, in the example of using the power split device 34 shown in FIG. 1, the rotational speed Nm of the MG2 32 can be determined in accordance with the vehicle speed. Because of this, there is a relationship that, if the rotational speed Ng of the MG1 30 is also determined, the remaining engine speed Ne is determined accordingly. Therefore, according to the present embodiment, the rotational speed change rate dNg is included as one of the state quantities (control variables) that are to be controlled. Moreover, instead of the rotational speed change rate dNg of the MG1 30, an engine speed change rate dNe may be used as one of the control variables. In this example, a similar control to when the MG1 rotational speed change rate dNg is used can also be achieved based on the relationship described above. Furthermore, instead of the rotational speed change rates dNg and dNe, the MG1 rotational speed change rate dNg itself or the engine speed Ne (rad/s) itself, for example, may alternatively be used.

(Manipulated Variable Determination Section)

The manipulated variable determination section 58 determines optimal manipulated variables for controlling the state quantities (Tp, Pchg and dNg) described above such that they approach the respective target state quantities that are target values of thereof. Because of this, the manipulated variable determination section 58 has a function as an optimal manipulated variable searcher. As an example, the manipulated variables used in the present embodiment are the engine torque Te, the MG1 torque Tg and the MG2 torque Tm.

Formula (1) described below indicates state equations that illustrate a relationship between the control variables (Tp, Pchg and dNg) and the manipulated variables (Te, Tg and Tm). As shown in this formula (1), the relationship between the control variables and the manipulated variables in the powertrain system 10 can be expressed in linear equations.

$$\begin{bmatrix} Tp \\ Pchg \\ dNg \end{bmatrix} = \begin{bmatrix} c11 & c12 & c13 \\ c21 & c22 & c23 \\ c31 & c32 & c33 \end{bmatrix} \begin{bmatrix} Te \\ Tg \\ Tm \end{bmatrix} \quad (1)$$

In formula (I), reference characters c ($c_{11}$, $c_{12}$, . . . ) denotes constant values determined depending on the hardware specifications of the powertrain system 10 (for example, inertia and gear ratio of each part of the powertrain) except reference characters $c_{22}$ and $c_{23}$ concerning the charge/discharge amount Pchg and the torques Tg and Tm. The reference characters $c_{22}$ and $c_{23}$ vary depending on changes in the rotational speeds Ng and Nm during the operation.

The manipulated variable determination section 58 solves a linear programming problem to determine the manipulated variables of the torque devices that maximally achieve the target state quantities within constraints of the powertrain system 10, based on the state equations of formula (1). Moreover, the manipulated variable determination section 58 sends the determined manipulated variables to the torque device control section 60.

Furthermore, according to the manipulated variable determination section 58 of the present embodiment, the priority of three target state quantities (Tp, Pchg and dNg) is taken into consideration in order to determine the manipulated variables. In detail, the manipulated variables that achieve each of the three target state quantities (Tp, Pchg and dNg) to the maximum extent possible in descending order of priority (i.e., in order from the highest priority) are determined by solving the linear programming problem while satisfying the constraints described above. Because of this, as shown in FIG. 2, the priority is inputted to the manipulated variable determination section 58 in addition to the target state quantities and various constraint values of the constraints. In addition, in order to determine the reference characters $c_{22}$ and $c_{23}$, the current rotational speed information (i.e., the MG1 rotational speed Ng (or the engine speed Ne) and the MG2 rotational speed Nm (or the vehicle speed)) is inputted to the manipulated variable determination section 58.

(Torque Device Control Section)

The torque device control section 60 shown in FIG. 2 controls the torque devices (the internal combustion engine 20, the MG1 30 and the MG2 32) in accordance with the respective manipulated variables (Te, Tg and Tm) determined by the manipulated variable determination section 58. In detail, with regard to the internal combustion engine 20, the torque device control section 60 determines the respective target values of the throttle opening degree, the fuel injection amount and the spark timing that are required to achieve the engine torque Te determined by the manipulated variable determination section 58. As a result, the actuators for the engine torque control (the throttle valve 22, the fuel injection valves 24 and the ignition device 26) are controlled such that the individual target values determined by the torque device control section 60 are achieved. With regard to the MG1 30 and the MG2 32, the torque device control section 60 similarly determines the respective target values of designated control parameters, such as electric current value and frequency, that are required to achieve the MG torques Tg and Tm determined by the manipulated variable determination section 58. As a result, the MG1 30 and the MG2 32 are controlled by controlling the inverter 40 such that the individual target values determined by the torque device control section 60 are achieved.

(Objective Function)

Then, an objective function (evaluation function) f of the linear programming problem used to determine the manipulated variables in the manipulated variable determination section 58 will be described. Formula (2) described below corresponds to an example of the objective function f. In more detail, this linear programming problem corresponds to a minimization problem to find a solution that minimizes the objective function f under the constraints. Hereunder, for ease of explanation, the present linear programming problem associated with the objective function f is also referred to as a "linear programming problem F".

Minimization: $f=P_1(y_1^-+y_1^+)+P_2(y_2^-+y_2^+)+P_3(y_3^-+y_3^+)$ (2)

In formula (2), $P_1$, $P_2$ and $P_3$ denote the priority of the target state quantities Tp, Pchg and dNg, respectively. According to the present embodiment, as an example, the priority is determined such that the priority $P_1$ of the driving torque Tp becomes the highest, the priority $P_3$ of the rotational speed change rate dNg becomes the second highest, and the priority $P_2$ of the charge/discharge amount Pchg becomes the lowest. According to the present embodiment, the priority is treated as being not changed during the operation of the vehicle. However, which priority of the target state quantities is higher may be changed depending on the configuration of the powertrain system or selected target state quantities.

According to the present embodiment, as an example, the priorities $P_1$-$P_3$ are given as priority order. In detail, in the example of the priority order, the values of the priorities $P_1$-$P_3$ correspond to primitive priority factors associated with the priority orders of the respective target state quantities. As an example according to the present embodiment, the primitive priority factor $P_1$ means a coefficient that is absolutely greater than the primitive priority factor $P_3$, and the primitive priority factor $P_3$ means a coefficient that is absolutely greater than the primitive priority factor $P_2$ (i.e., $P_1 >>> P_3 >>> P_2$). In addition, "what Px is absolutely greater than Py" means satisfying a relationship that, even if any large natural number n is multiplied with respect to the Py, Px does not become equal to or lower than Py. It should be noted that details of the procedure for searching for the manipulated variables (i.e., optimal manipulated variables) that achieve the target state quantities to the maximum extent possible in consideration of the priorities $P_1$-$P_3$ as the priority orders will be descried below along with the processing of step S114.

Furthermore, in formula (2), reference characters $y_1^-$ and $y_1^+$ respectively denote the amounts of shortage and excess of the driving torque Tp with respect to the target value (i.e., the value of the target state quantity), and both are positive values. Thus, the sum $(y_1^-+y_1^+)$ of these reference characters corresponds to the amount of deviation of the driving torque Tp with respect to the target value. Reference characters $y_2^-$ and $y_2^+$ respectively denote the amounts of shortage and excess of the charge/discharge amount Pchg with respect to the target value, and reference characters $y_3^-$ and $y_3^+$ respectively denote the amounts of shortage and excess of the rotational speed change rate dNg with respect to the target value, and the same applies hereafter. According to formula (2), what the amounts of deviation of the state quantities with respect to the target values are small means that the value of the objective function f becomes small.

(Constraints)

As an example, the constraints described above are expressed as formulas (3)-(12).

$c_{11}x_1+c_{12}x_2+c_{13}x_3+y_1^--y_1^+=g_1$ (3)

$c_{21}x_1+c_{22}x_2+c_{23}x_3+y_2^--y_2^+=g_2$ (4)

$c_{31}x_1+c_{32}x_2+c_{33}x_3+y_3^--y_3^+=g_3$ (5)

$Tpmn \leq c_{11}x_1+c_{12}x_2+c_{13}x_3 \leq Tpmx$ (6)

$Win \leq c_{21}x_1+c_{22}x_2+c_{23}x_3 \leq Wout$ (7)

$dNgmn \leq c_{31}x_1+c_{32}x_2+c_{33}x_3 \leq dNgmx$ (8)

$0 \leq x_1 \leq Temx$ (9)

$Tgmn \leq x_2 \leq Tgmx$ (10)

$Tmmn \leq x_3 \leq Tmmx$ (11)

$y_i^-, y_i^+ \geq 0 (i=1,2,3)$ (12)

Variables $x_1$, $x_2$ and $x_3$ in each formula described above are respectively associated with the engine torque Te, the MG1 torque Tg and the MG2 torque Tm that are manipulated variables. Reference characters $g_1$, $g_2$ and $g_3$ in formulas (3)-(5) respectively correspond to a target value of the driving torque Tp, a target value of the charge/discharge amount Pchg and a target value of the rotational speed change rate dNg that are state quantities (i.e., specific values of the target state quantities). These formulas (3)-(5) represent relationships between the manipulated variables and the target state quantities including terms $(y_1^-+y_1^+)$ that indicate the amounts of deviation of the state quantities with respect to the target values.

Reference characters Tpmn and Tpmx in formula (6) correspond to a lower limit constraint value and an upper limit constraint value of the driving torque Tp, respectively. Reference characters Win and Wout in formula (7) correspond to a lower limit constraint value and an upper limit constraint value of the charge/discharge amount Pchg, respectively. Reference characters dNgmn and dNgmx in formula (8) correspond to a lower limit constraint value and an upper limit constraint value of the MG1 rotational speed change rate dNg, respectively. That is to say, each of formulas (6)-(8) indicates a range of the constraints of the respective state quantities (Tp, Pchg and dNg).

Reference characters Temx in formula (9) corresponds to an upper limit constraint value of the engine torque Te, and an example of a lower limit constraint value thereof is zero. Reference characters Tgmn and Tgmx in formula (10) correspond to a lower limit constraint value and an upper limit constraint value of the MG torque Tg, respectively. Reference characters Tmmn and Tmmx in formula (11) correspond to a lower limit constraint value and an upper limit constraint value of the MG2 torque Tg, respectively. That is to say, each of formulas (9)-(11) indicates a range of the constraints of the respective manipulated variables (Te, Tg and Tm). In addition, formula (12) indicates that shortage amounts $y_i^-$ and excess amounts $y_i^+$ of the individual state quantities with respect to the associated target values are not negative values.

The problem (linear programming problem F) that finds the manipulated variables that achieve the target state quantities (Tp, Pchg and dNg) to the maximum possible in accordance with the priorities $P_1$-$P_3$ within the constraints can be organized and represented using the objective function f shown in formula (2) and the constraints shown in formulas (3)-(12), as described above.

(Example of Equivalence Transformation to Linear Programming Problem in Equation Standard Form)

Formulas (13)-(28) described below are obtained by adding new variables $x_2'$, $x_2''$, $x_3'$, $x_3''$ and $x_i$ (i=4-14) to the respective formulas (3)-(11) of the constraints to modify them. According to Formulas (13)-(28), the constraints (formulas (3)-(11)) can be represented using only equality constraints (formulas (13)-(26)) and non-negative constraints of the variables (formulas (27) and (28)). It should be noted that the variable $x_2$ already described is equal to the difference $(x_2'-x_2'')$ between the variable $x_2'$ and the variable $x_2''$, and similarly, the variable $x_3$ is equal to the difference $(x_3'-x_3'')$ between the variable $x_3'$ and the variable $x_3''$.

$c_{11}x_1+c_{12}(x_2'-x_2'')+c_{13}(x_3'-x_3'')+y_1^--y_1^+=g_1$ (13)

$$c_{21}x_1+c_{22}(x_2'-x_2'')+c_{23}(x_3'-x_3'')+y_2^--y_2^+=g_2 \quad (14)$$

$$c_{31}x_1+c_{32}(x_2'-x_2'')+c_{33}(x_3'-x_3'')+y_3^--y_3^+=g_3 \quad (15)$$

$$c_{11}x_1+c_{12}(x_2'-x_2'')+c_{13}(x_3'-x_3'')-x_4=Tpmn \quad (16)$$

$$c_{11}x_1+c_{12}(x_2'-x_2'')+c_{13}(x_3'-x_3'')+x_5=Tpmx \quad (17)$$

$$c_{21}x_1+c_{22}(x_2'-x_2'')+c_{23}(x_3'-x_3'')-x_6=Win \quad (18)$$

$$c_{21}x_1+c_{22}(x_2'-x_2'')+c_{23}(x_3'-x_3'')+x_7=Wout \quad (19)$$

$$c_{31}x_1+c_{32}(x_2'-x_2'')+c_{33}(x_3'-x_3'')-x_8=dNgmn \quad (20)$$

$$c_{31}x_1+c_{32}(x_2'-x_2'')+c_{33}(x_3'-x_3'')+x_9=dNgmx \quad (21)$$

$$x_1+x_{10}=Temx \quad (22)$$

$$x_2'-x_2''-x_{11}=Tgmn \quad (23)$$

$$x_2'-x_2''+x_{12}=Tgmx \quad (24)$$

$$x_3'-x_3''-x_{13}=Tmmn \quad (25)$$

$$x_3'-x_3''+x_{14}=Tmmx \quad (26)$$

$$x_i \geq 0\, i=1,4,5,14 \quad (27)$$

$$x_2',x_2'',x_3',x_3'' \geq 0 \quad (28)$$

$$y_i^-,y_i^+ \geq 0\,(i=1,2,3) \quad (12)$$

As a result of the formulas being modified as just described, the linear programming problem F described above can be formulated in the equation standard form (that is, in a form that the objective function (evaluation function) is a linear function and that the constraints only include equation constraints and non-negative constraints). The linear programming problem F formulated in this way can be solved by the use of, for example, a simplex method as described below with reference to FIG. 3. It should be noted that any other known solution method (for example, internal point method) may be used as a solution method of the linear programming problem F.

1-2-2. Processing by Control Device

Figure 3:
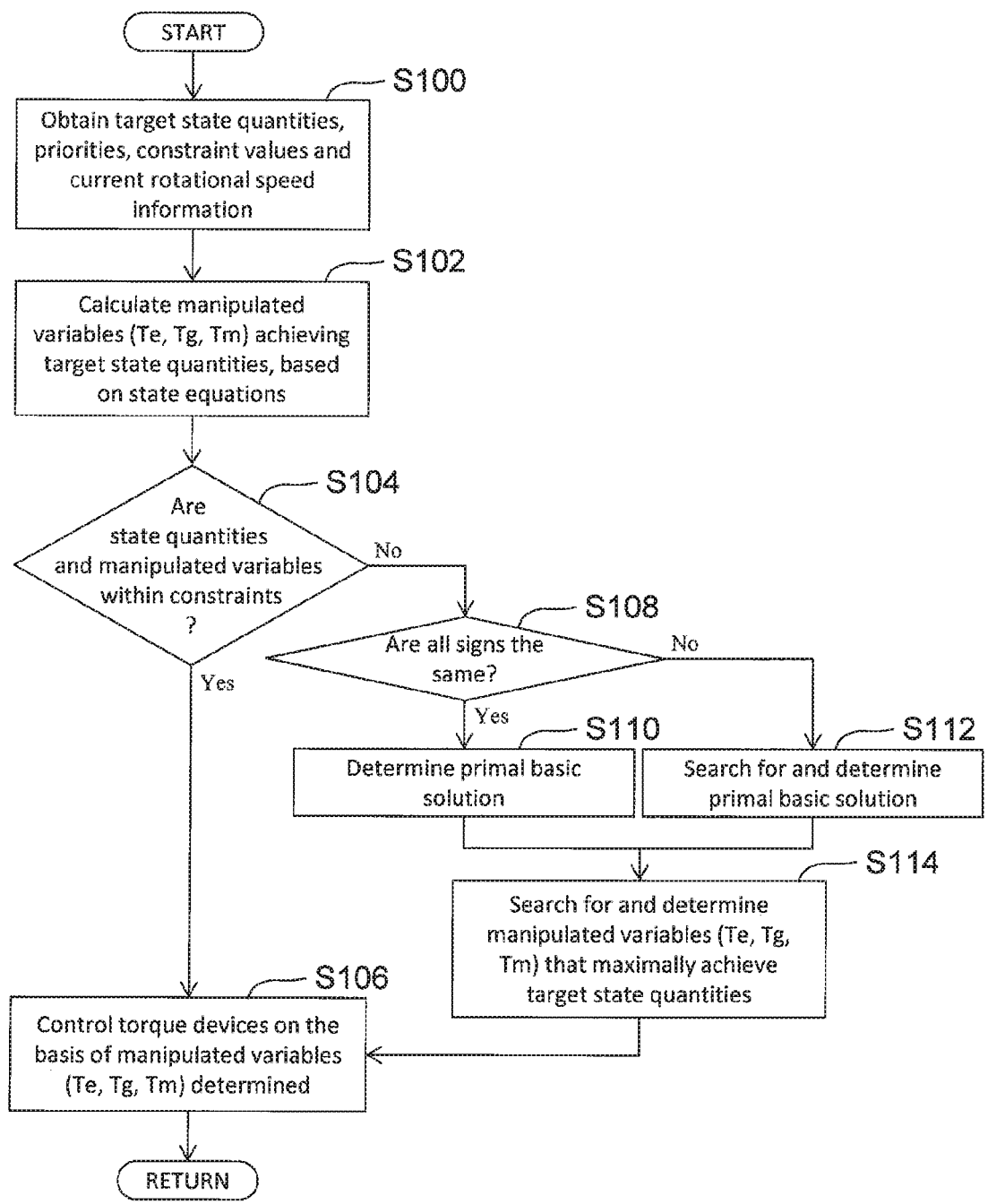
FIG. 3 is a flow chart that illustrates a routine of the processing concerning the torque device control according to the first embodiment of the present disclosure.

FIG. 3 is a flow chart that illustrates a routine of the processing concerning the torque device control according to the first embodiment of the present disclosure. The present routine is repeatedly executed at a designated control interval during the operation of the powertrain system 10. To be more specific, the "manipulated variable determination section 58" according to the present embodiment executes the processing of steps S100 to S104, and S108 to S114 described below, and the "torque device control section 60" executes the processing of step S106. In addition, the manipulated variable determination section 58 corresponds to an example of the "first manipulated variable determination section" according to the present disclosure.

According to the routine shown in FIG. 3, first, in step S100, the control device 50 obtains the target state quantities ($g_1$-$g_3$), the priorities $P_1$-$P_3$ of the target state quantities (in this routine, priority order), the individual constraints of the state quantities and manipulated variables (for example, Tpmn in formulas (6) to (11)) and the current rotational speed information (see FIG. 2). In more detail, the operational state of the vehicle changes in accordance with a request from the driver of the vehicle. If, for example, the operational state changes, the target state quantities and the constraints also change. Because of this, according to step S100, the target state quantities and the constraints that both depend on the operational state of the vehicle are obtained on the basis of the information from the various sensors connected to the control device 50 and predetermined maps. Thereafter, the processing proceeds to step S102.

According to step S102, the control device 50 substitutes the target state quantities obtained in step S100 into simultaneous equations expressed by formula (1) and solves the simultaneous equations to calculate the manipulated variables (Te, Tg and Tm) that achieve the target state quantities (in other words, the manipulated variables associated with the target state quantities). This kind of calculation of the manipulated variables (Te, Tg and Tm) also corresponds to an example of determination of the manipulated variables that achieve the target state quantities to the maximum extent possible. Thereafter, the processing proceeds to step S104.

According to step S104, the control device 50 determines whether or not the individual target state quantities obtained in step S100 and the individual manipulated variables calculated in step S102 are located within the constraints (i.e., in the ranges satisfying the individual constraint values, which are obtained in step S100). In more detail, according to this step S104, it is determined using a mathematical way whether or not the simultaneous equations described above have a single solution and this solution is located within the range of the constraint values.

If the determination result of step S104 is positive, the processing proceeds to step S106. According to step S106, the control device 50 controls the individual torque devices (the internal combustion engine 20, the MG1 30 and the MG2 32) in accordance with the calculated manipulated variables. Thereafter, the current processing cycle is ended.

If, on the other hand, the determination result of step S104 is negative, the control device 50 executes the processing of steps S108 to S114 in order to search for and determine manipulated variables (that is, the optimal solution of the manipulated variables) that achieves the target state quantities to the maximum extent possible within the constraints. In detail, first, the processing proceeds to step S108 in order to obtain a primal basic solution of the linear programming problem F according to the present routine.

In step S108, the control device 50 determines whether the sign of each of the upper and lower limit constraint values of the state quantities and manipulated variables (Tpmn, Tpmx, Win, Wout, dNgmn, dNgmx, Temx, Tgmn, Tgmx, Tmmn and Tmmx) and the sign of the corresponding one of coefficients of slack variables $x_4$-$x_{14}$ (see formulas (16)-(26)) are all the same or not. In addition, if a constraint value (for example, Tpmn) associated with any one of the slack variables $x_4$-$x_{14}$ is zero, the sign of this constraint value becomes zero. However, in step S108, the sign of the constraint value is determined to be the same as the sign of the corresponding one of the slack variables $x_4$-$x_{14}$.

If the determination result of step S108 is positive, the processing proceeds to step S110. In step S110, the control device 50 sets a primal basic solution of the variables $x_1$, $x_2'$, $x_2''$, $x_3'$, $x_3''$, $y_i^-$, and $y_i^+$ (i=1-3) and slack variables $x_4$-$x_{14}$ using a manner described below.

That is to say, as shown in formulas (29)-(31) described below, the variables $x_1$, $x_2'$, $x_2''$, $x_3'$ and $x_3''$ are made zero. The values of $y_i^-$ and $y_i^+$ (i=1-3) are changed in accordance with the signs of the corresponding target values (i.e., the values of the target state quantities) $g_1$, $g_2$ and $g_3$ of the state quantities. In detail, when the target value $g_1$ is equal to or greater than zero, the variable $y_1^-$ is made equal to the target value $g_1$ and the variable $y_1^+$ is made zero. When, on the other hand, the target value $g_1$ is negative, the variable $y_1^-$ is made zero and the variable $y_1^+$ is made equal to the target value $g_1$. This also applies to the relationships between the other variables $y_2^-$, $y_2^+$, $y_3^-$ and $y_3^+$ and the target values $g_2$ and $g_3$. In addition, the slack variable $x_4$ is made equal to $-$Tpmn, and, when Tpmn is zero, the slack variable $x_4$ is made zero. This also applies to the other slack variables $x_5$-$x_{14}$. The primal basic solution can be set in this way due to the following reason. That is to say, if the signs of the individual constraint values and the signs of the coefficients of the slack variables are all the same, it can be found that the combination of values of the variables (such as, $x_1$) that are set as the primal basic solution in step S110 is associated with one of peaks of the convex polyhedron (see FIG. 4, for example) generated by the constraint formulas represented by formulas (12)-(28).

$$\begin{bmatrix} x1 \\ x2' \\ x2'' \\ x3' \\ x3'' \\ y_1^- \\ -y_1^+ \\ y_2^- \\ -y_2^+ \\ y_3^- \\ -y_3^+ \\ -x4 \\ x5 \\ -x6 \\ x7 \\ -x8 \\ x9 \\ x10 \\ -x11 \\ x12 \\ -x13 \\ x14 \end{bmatrix} = \begin{bmatrix} 0 \\ 0 \\ 0 \\ 0 \\ 0 \\ \square \\ \square \\ \square \\ \square \\ \square \\ \square \\ Tpmn \\ Tpmx \\ Win \\ Wout \\ dNgmn \\ dNgmx \\ Temx \\ Tgmn \\ Tgmx \\ Tmmn \\ Tmmx \end{bmatrix}$$  (29)

Where $g_1 \geq 0$ $$\begin{bmatrix} y_1^- \\ -y_1^+ \end{bmatrix} = \begin{bmatrix} g_1 \\ 0 \end{bmatrix}$$  (30)

Where $g_1 < 0$ $$\begin{bmatrix} y_1^- \\ -y_1^+ \end{bmatrix} = \begin{bmatrix} 0 \\ g_1 \end{bmatrix}$$  (31)

The same applies to $g_2$ and $g_3$.

If, on the other hand, the determination result of step S108 is negative, that is, if the signs are not the same in all combinations of the constraint values and the corresponding coefficients of the slack variables, the processing proceeds to step S112. In step S112, in order to obtain a primal basic solution of the variables $x_1$, $x_2'$, $x_2''$, $x_3'$, $x_3''$, $y_i^-$ and $y_i^+$ (i=1-3) and slack variables $x_4$-$x_{14}$, the control device 50 executes the processing to solve another linear programming problem that minimizes an objective function (evaluation function) z represented by formula (32) while satisfying constraints shown below. Hereunder, for ease of explanation, the linear programming problem for obtaining the primal basic solution in this way is referred to as the "linear programming problem Z".

Minimization: $z = \sum_{j=1}^{14} t_j$  (32)

Constraints:

$t_1 = g_1 - \{c_{11}x_1 + c_{12}(x_2'-x_2'') + c_{13}(x_3'-x_3'') + y_1^- - y_1^+\}$ $t_2 = g_2 - \{c_{21}x_1 + c_{22}(x_2'-x_2'') + c_{23}(x_3'-x_3'') + y_2^- - y_2^+\}$ $t_3 = g_3 - \{c_{31}x_1 + c_{32}(x_2'-x_2'') + c_{33}(x_3'-x_3'') + y_3^- - y_3^+\}$ $t_4 = Tpmn - \{c_{11}x_1 + c_{12}(x_2'-x_2'') + c_{13}(x_3'-x_3'') - x_4\}$ $t_5 = Tpmx - \{c_{11}x_1 + c_{12}(x_2'-x_2'') + c_{13}(x_3'-x_3'') + x_5\}$ $t_6 = Win - \{c_{21}x_1 + c_{22}(x_2'-x_2'') + c_{23}(x_3'-x_3'') - x_6\}$ $t_7 = Wout - \{c_{21}x_1 + c_{22}(x_2'-x_2'') + c_{23}(x_3'-x_3'') + x_7\}$ $t_8 = dNgmn - \{c_{31}x_1 + c_{32}(x_2'-x_2'') + c_{33}(x_3'-x_3'') - x_8\}$ $t_9 = dNgmx - \{c_{31}x_1 + c_{32}(x_2'-x_2'') + c_{33}(x_3'-x_3'') + x_9\}$ $t_{10} = Temx - \{x_1 + x_{10}\}$ $t_{11} = Tgmn - \{x_2'-x_2''-x_{11}\}$ $t_{12} = Tgmx - \{x_2'-x_2''+x_{12}\}$ $t_{13} = Tmmn - \{x_3'-x_3''+x_{13}\}$ $t_{14} = Tmmx - \{x_3'-x_3''+x_{14}\}$ $x_i \geq 0 \ i=1,4,5,14$ $x_2', x_2'', x_3', x_3'' \geq 0$ $y_i^-, y_i^+ \geq 0 \ i=1,2,3$ $t_j \geq 0 \ i=1,2,14$ To be more specific, reference characters $t_j$ (i=1-14) are artificial variables introduced to search for the primal basic solution (feasible solution). According to the constraints described above, by moving the left-hand side of formulas (13)-(26) to the right-hand side thereof, the artificial variables $t_j$ are each represented as values equal to values on the right-hand side obtained as a result. In step S112, in order to solve this linear programming problem Z, the control device 50 searches for and determines the values of the variables $x_1$, $x_2'$, $x_2''$, $x_3'$, $x_3''$, $y_i^-$ and $y_i^+$ (i=1-3) and slack variables $x_4$-$x_{14}$ (that is, the primal basic solution) that make the objective function z zero using, for example, a simplex method (that is, that make all the artificial variables $t_j$ zero). It should be noted that, if the objective function z does not become zero (that is, if all of the artificial variables $t_j$ do not become zero), there is no feasible solution that satisfies the constraints. According to the powertrain system 10, the individual constraint values are determined such that a situation that there is no feasible solution as just described does not occur.

After the primal basic solution is obtained by the processing of step S110 or S112, the processing proceeds to step S114. In step S114, the control device 50 searches for and determines the manipulated variables (Te, Tg and Tm) that maximally achieves the target state quantities (Tp, Pchg and dNg) in accordance with the priorities $P_1$-$P_3$ within the constraints (see formulas (12)-(28)), that is, the optimal solution of the manipulated variables. In detail, the control device 50 uses the primal basic solution obtained by the processing of step S110 or S112 to execute the processing for solving the above-described linear programming problem F organized using the objective function f in formula (2) and the constraints (see formulas (12)-(28)).

Figure 4:
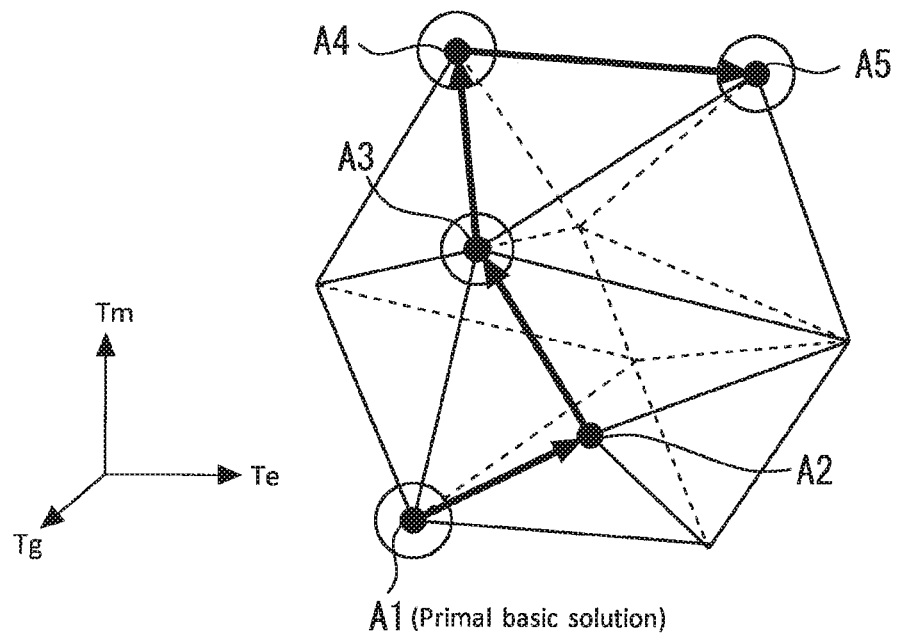
FIG. 4 is a conceptual diagram used to describe the outline of algorithm for searching for an optimal solution of manipulated variables with priority taken into consideration.

FIG. 4 is a conceptual diagram used to describe the outline of the algorithm for searching for the optimal solution of the manipulated variables with the priorities $P_1$-$P_3$ taken into consideration. FIG. 4 represents an example of using the simplex method. In the example of the linear programming problem F according to the present embodiment in which three manipulated variables are used, the region in which the constraints are satisfied are three-dimensionally represented by a convex polyhedron as shown in FIG. 4. In more detail, in the region (space) inside this kind of convex polyhedron, all the constraints are satisfied.

The optimal solution of the manipulated variables is obtained at any one of the vertexes of the convex polyhedron. According to the present algorithm using the simplex method as an example, the optimal solution is searched while following the vertexes of the convex polyhedron. Moreover, according to the present embodiment, as a detailed example of the priorities $P_1$-$P_3$, the priority order is used as described above. The search for the optimal solution with the priority order taken into consideration is performed in the following procedure.

A vertex A1 in FIG. 4 is associated with the primal basic solution. The search for the optimal solution is started from this vertex A1. The target state quantity that is the highest in the priority order in the example according to the present embodiment is the target value $g_1$ of the driving torque Tp. Because of this, first, a vertex A2 is searched for to reduce the amount of deviation $(y_1^- + y_1^+)$ of the driving torque Tp from the target value $g_1$ as compared to the vertex A1. This search is continued until a vertex at which the amount of deviation $(y_1^- + y_1^+)$ can be no longer reduced is obtained even when moving from a vertex in any direction. In FIG. 4, a vertex A3 corresponds to an example of this kind of vertex. It should be noted that, where there are a plurality of vertexes that can reduce the amount of deviation $(y_1^- + y_1^+)$ in the course of this kind of search, it is sufficient to ensure that the search is completed in a finite number of times by selecting a destination vertex using the smallest subscript rule (Bland's rule).

According to the present algorithm, then, a vertex A4 at which the amount of deviation $(y_3^- + y_3^+)$ from the target value $g_3$ of the rotational speed change rate dNg that is the target state quantity having the second highest order of priority can be reduced is searched while the amount of deviation $(y_1^- + y_1^+)$ of the driving torque Tp that is the highest in priority order is not increased. This search is also continued until a vertex at which the amount of deviation $(y_3^- + y_3^+)$ can be no longer reduced is obtained even when moving from a vertex in any direction. In FIG. 4, the vertex A4 corresponds to an example of this kind of vertex.

After the vertex A4 is obtained, similarly, the search for a vertex is performed to reduce the amount of deviation $(y_2^- + y_2^+)$ from the target value $g_2$ of the charge/discharge amount Pchg that is the target state quantity and the lowest in priority order while neither the amount of deviation $(y_1^- + y_1^+)$ of the driving torque Tp nor the amount of deviation $(y_3^- + y_3^+)$ of the rotational speed change rate dNg is increased. According to the example shown in FIG. 4, a vertex A5 corresponds to a vertex at which the amount of deviation $(y_2^- + y_2^+)$ can be minimized while not increasing both the amounts of deviation $(y_1^- + y_1^+)$ and $(y_3^- + y_3^+)$.

According to the present algorithm, the value of the manipulated variable at the vertex A5 described above is determined as the optimal solution. According to the manipulated variable determination section 58 of the present embodiment that uses this kind of algorithm, the manipulated variables of the torque devices that maximally achieve the target state quantities in the order from the highest one in priority order within the constraints can be determined by solving the linear programming problem F.

The processing according to the present routine proceeds to step S106 after step S114. As a result, the torque devices are controlled in accordance with the manipulated variables (Te, Tg and Tm; optimal solution) determined by the processing of step S114.

1-3. Effects

According to the torque device control of the present embodiment described so far, the processing is performed by the manipulated variable determination section 58 to determine the optimal manipulated variables by solving the above-described linear programming problem F on the basis of the linear state equations that define the relationships between the controlled state quantities (i.e., control variables) and the manipulated variables of the torque devices. As a result, the manipulated variables of the torque devices are determined so as to achieve the target state quantities to the maximum extent possible while satisfying the constraints, and the torque devices can be controlled in accordance with the determined manipulated variables.

Moreover, according to the torque device control of the present embodiment, the relationships between the state quantities (control variables) and the manipulated variables in the driveline of the powertrain system 10 are expressed by the linear state equations. The state equations of the driveline of a powertrain system is linear without depending on the system configuration. Therefore, a highly versatile control structure (i.e., control platform) that can be easily applied to another powertrain system provided with one or more desired torque devices can be constructed by appropriately changing the type and number of the state quantity and manipulated variable that are substituted into the state equations. In other words, a torque device control that can be applied to powertrain systems having other configurations (for example, see third to eighth embodiments described below) can be achieved without changing the control structure.

Moreover, in an example of using a plurality of target state quantities as in the torque device control according to the present embodiment, it is desirable to be able to determine optimal manipulated variables with differences in the priority among the plurality of target state quantities also taken into consideration. In this regard, according to the manipulated variable determination section 58 of the present embodiment, the manipulated variables that maximally achieve the plurality of target state quantities in the order from one having the highest priority order is determined by solving the linear programming problem F within the constraints. Because of this, by the use of the manipulated variable determination section 58, the manipulated variables according to the priority of the target state quantities can be determined without changing the control structure. Furthermore, according to the manipulated variable determination section 58, the level of the priority (priority order) is appropriately changed between the plurality of the target state quantities, whereby the individual manipulated variables can be determined such that any desired target state quantities are achieved to the maximum extent possible. In addition, according to the present embodiment in which the relationships between the control variables (state quantities) and the manipulated variables are expressed by the linear state equations, the effects of the individual manipulated variables with respect to the corresponding control variables are multiaxially treated.

Figure 5:
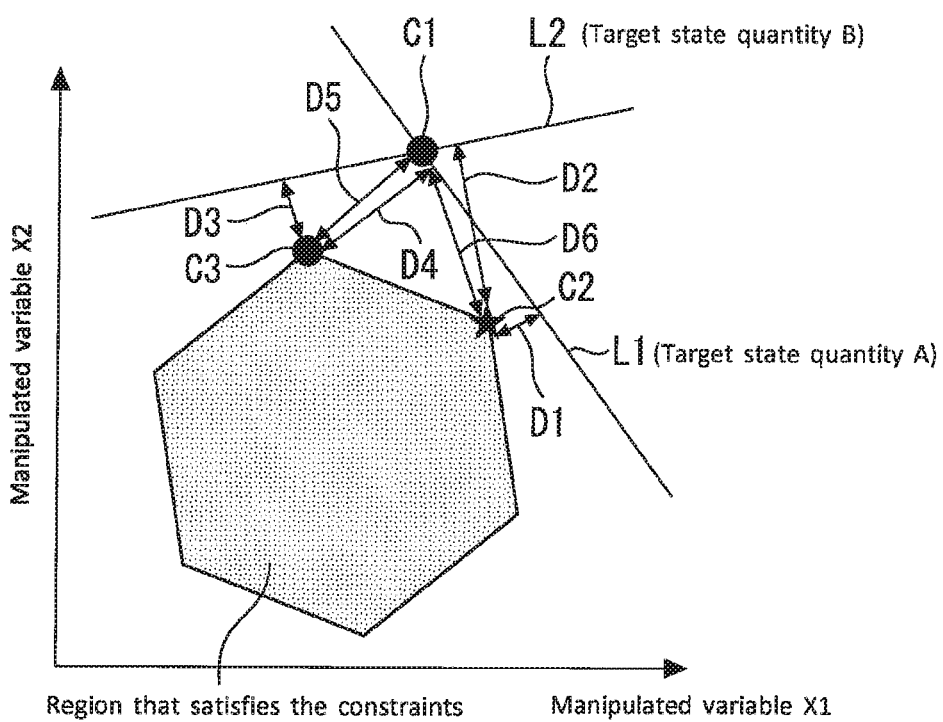
FIG. 5 is a conceptual diagram used to describe the difference of manners of determining the manipulated variables depending on whether or not priority order is set.

With regard to the determination of the manipulated variables with the priority order taken into consideration, a supplemental description is made below. FIG. 5 is a conceptual diagram used to describe the difference of manners of determining the manipulated variables depending on whether or not the priority order is set. In FIG. 5, for ease of description, an example of having two target state quantities A and B and two manipulated variables X1 and X2 is used.

In the example of two manipulated variables, the region that satisfies the constraints is represented by a polygon as shown in FIG. 5. A straight line L1 in FIG. 5 corresponds to a straight line (i.e., state equation) that satisfies the target state quantity A, and a straight line L2 corresponds to a straight line (i.e., state equation) that satisfies the target state quantity B. Thus, an intersection point C1 of these straight lines L1 and L2 corresponds to a point that satisfies both the target state quantities A and B.

As shown in FIG. 5, the intersection point C1 is located outside the region that satisfies the constraints. A vertex C2 corresponds to a vertex at which the amount of deviation from the target state quantity A (i.e., straight line L1) is the smallest among the vertexes of the polygon shown in FIG. 5. Also, at the vertex C2, the amount of deviation D1 from the target state quantity A (i.e., distance D1 from the straight line L1) is smaller than the amount of deviation D2 from the target state quantity B. In contrast to the vertex D2, at another vertex C3, the amount of deviation D3 from the target state quantity B is smaller than the amount of deviation D4 from the target state quantity A. In addition, regarding the distance with respect to the intersection point C1, a distance D5 from the vertex C3 is shorter than a distance D6 from the vertex C2.

In an example in which the priority order of the target state quantity A is made higher than the priority order of the target state quantity B under the constraints shown in FIG. 5, when the processing by the manipulated variable determination section 58 is performed using the simplex method as an example, the results are as follows. That is to say, the values of the manipulated variables X1 and X2 at the vertex C2 is determined as the optimal solution. This is because, although regarding the distance with respect to the intersection point C1, the distance D6 at the vertex C2 is longer than the distance D5 at the vertex C3, regarding the distance with respect to the straight line L1 of the target state quantity A that is the highest in priority order, the distance D1 at the vertex C2 becomes shorter than any of distances from the other five vertexes (including the vertex C3) to the straight line L1. If, on the other hand, the search is performed using, for example, the simplex method without the priority order taken into consideration, it is considered that the values of the manipulated variables X1 and X2 at the vertex C3 at which the distance with respect to the intersection point C1 is relatively short are determined as the optimal solution.

Furthermore, in an example in which the priority order of the target state quantity B is relatively high contrary to the example described above, the vertex C3 can be selected in order to determine the optimal solution without depending on whether the priority order is used or not.

As can be seen from the above description, according to the manipulated variable determination section 58 of the present embodiment that can search for the optimal solution with the priority order also taken into consideration, the manipulated variables that achieve the target state quantities to the maximum extent possible in the order from one having the highest priority order can be surely selected without depending on positional relationships between the vertexes of the constraints and the straight lines satisfying the target state quantities.

1-4. Another Specific Example of Using Priority

According to the first embodiment described above, the priority order is taken as one of specific examples of using the priorities $P_1$-$P_3$. However, the "priority" according to the present disclosure may be given as weight, instead of the example of the priority order. This also applies to the following second embodiment.

In detail, in the example of the weight, the values of the priorities $P_1$-$P_3$ are made greater when the priority is higher. As a result, a higher priority term has a greater influence on the value of the objective function f than a lower priority term. In more detail, in the example of the weight, the value of the priority $P_1$ to $P_3$ may be properly determined such that the manipulated variables that are achieved to the maximum extent possible in the order from the target state quantity that is the highest in priority by solving the linear programming problem F.

2. Second Embodiment

Then, a second embodiment according to the present disclosure will be described with reference to FIGS. 6 to 9.

2-1. Example of Configuration of Powertrain System

Figure 7:
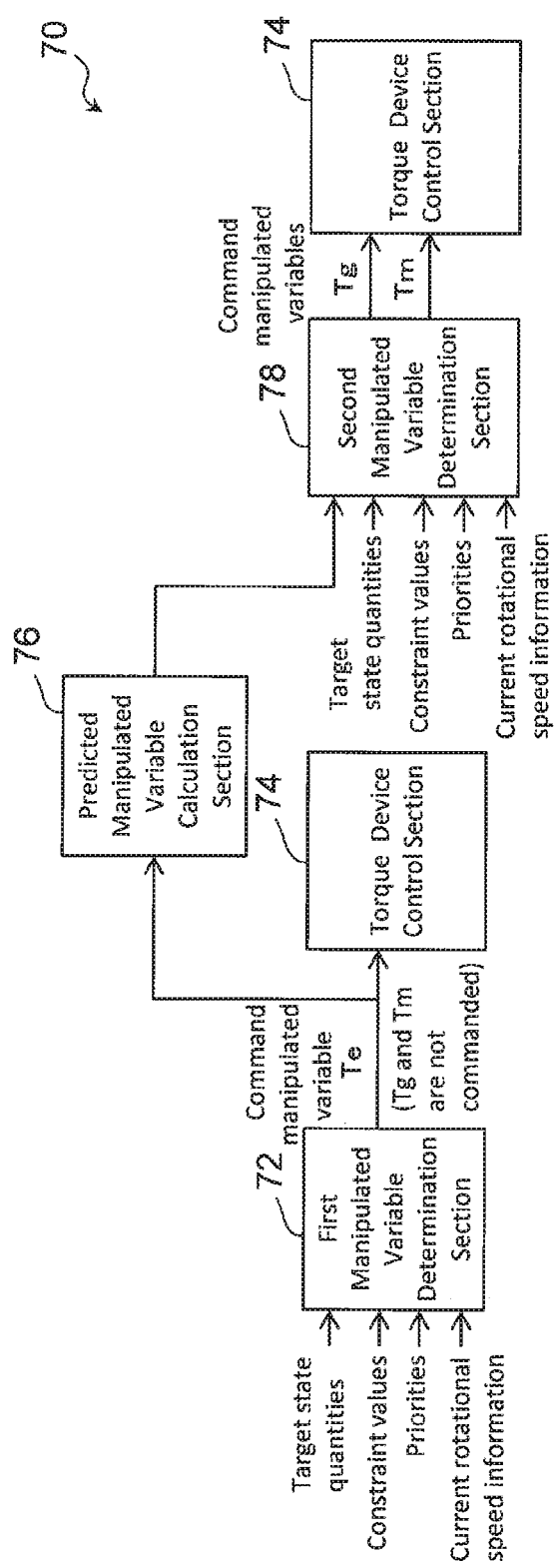
FIG. 7 is a block diagram that illustrates a functional configuration of a control device associated with a torque device control according to a second embodiment of the present disclosure.

A powertrain system according to the second embodiment is similar to the powertrain system 10 according to the first embodiment except that a control device 70 shown in FIG. 7 is included instead of the control device 50.

Figure 6:
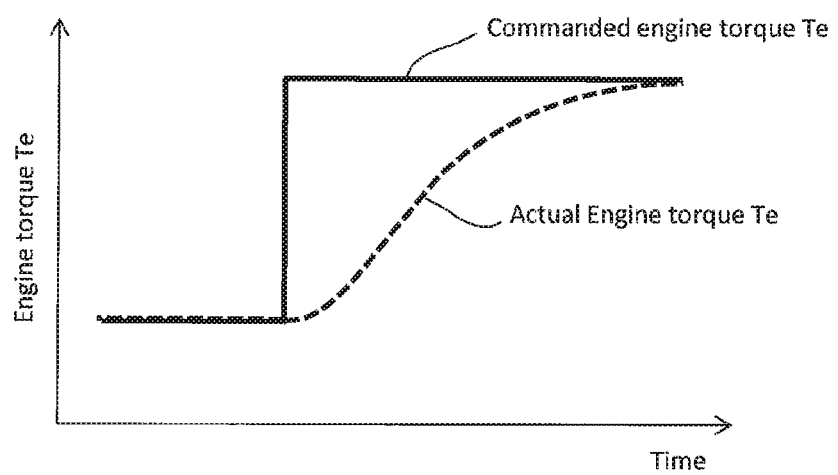
FIG. 6 is a graph that illustrates a response delay of the output (actual engine torque) of an internal combustion engine with respect to a change of a commanded engine torque.

2-2. Torque Device Control According to Second Embodiment 2-2-1. Issue Due to Response Delay of Torque Device The torque devices used in the powertrain system 10 are the internal combustion engine 20, the MG1 30 and the MG2 32. FIG. 6 is a graph that illustrates a response delay of the output (actual engine torque Te) of the internal combustion engine 20 with respect to a change of a commanded engine torque Te. Due to the influence of various delay causes, such as a delay of the intake system of the internal combustion engine 20 and a delay of combustion therein, the actual engine torque Te changes in association with a delay with respect to a change of the commanded engine torque Te (manipulated variable) as shown in FIG. 6. Because of this, a response delay of the actual value of a torque device with respect to a commanded value thereof is greater in the internal combustion engine 20 than in each of the MG1 30 and the MG2 32. It should be noted that each of the MG1 30 and the MG2 32 corresponds to an example of the "first torque device" according to the present disclosure, and the internal combustion engine 20 corresponds to an example of the "second torque device" according to the present disclosure.

The response delay of the output of the torque device is not taken into consideration when the manipulated variable determination section 58 according to the first embodiment determines the manipulated variables by the use of linear programming method. As a result, in an example in which a plurality of torque devices include a torque device having a relatively great response delay, the following issue may occur when the manipulated variables determined by the manipulated variable determination section 58 are commanded to the respective torque devices at the same timing. That is to say, there is a concern that, during the response delay after the manipulated variables are commanded, the torque devices may not become able to be controlled while maintaining a good balance between the manipulated variables of the respective torque devices determined by the manipulated variable determination section 58.

2-2-2. Torque Device Control with Response Delay Taken into Consideration

FIG. 7 is a block diagram that illustrates a functional configuration of the control device 70 associated with the torque device control according to the second embodiment of the present disclosure. The control device 70 is different from the control device 50 according to the first embodiment in terms of the following points. That is to say, in order to perform the torque device control, the control device 70 includes a "first manipulated variable determination section 72", a "torque device control section 74", a "predicted manipulated variable calculation section 76" and a "second manipulated variable determination section 78".

The first manipulated variable determination section 72 is different from the manipulated variable determination section 58 according to the first embodiment in terms of the following points. That is to say, although the first manipulated variable determination section 72 is the same as the manipulated variable determination section 58 with regard to the determination of the manipulated variables (Te, Tg and Tm) of the torque devices, it commands only the engine torque Te among the determined manipulated variables (Te, Tg and Tm). The torque device control section 74 immediately performs the control of the internal combustion engine 20 based on the engine torque Te commanded from the first manipulated variable determination section 72.

The predicted manipulated variable calculation section 76 calculates a predicted manipulated variable (predicted engine torque Te') obtained by reflecting the response delay of the output of the internal combustion engine 20 into the manipulated variable (Te) determined by the first manipulated variable determination section 72. To be more specific, as an example, the predicted manipulated variable calculation section 76 uses an engine model simulating the response delay of the engine torque Te to calculate the predicted (estimated) engine torque Te' with the response delay with respect to the commanded engine torque Te taken into consideration. This engine model corresponds to a model that defines a relationship between its input value (i.e., the commanded engine torque Te determined by the first manipulated variable determination section 72) and its output value (i.e., the predicted engine torque Te') with the response delay taken into consideration.

The second manipulated variable determination section 78 solves a linear programming problem to determine, based on linear state equations (see formula (33) described below) to which the predicted engine torque Te' calculated by the predicted manipulated variable calculation section 76 is inputted, manipulated variables (Tg and Tm) of the remaining torque devices (MG1 30 and MG2 32) such that the target state quantities are achieved to the maximum extent possible within constraints described below. Hereunder, for ease of description, this linear programming problem is referred to as a "linear programming problem F'". The details of the second manipulated variable determination section 78 is described below in association with step S204 of a routine shown in FIG. 8.

Furthermore, the second manipulated variable determination section 78 commands the determined manipulated variables (Tg and Tm) to the torque device control section 74. The torque device control section 74 immediately performs the control of the MG1 30 and MG2 32 based on the manipulated variables (commanded MG1 torque Tg and commanded MG2 torque Tm) determined by the second manipulated variable determination section 78.

2-2-3. Processing by Control Device

Figure 8:
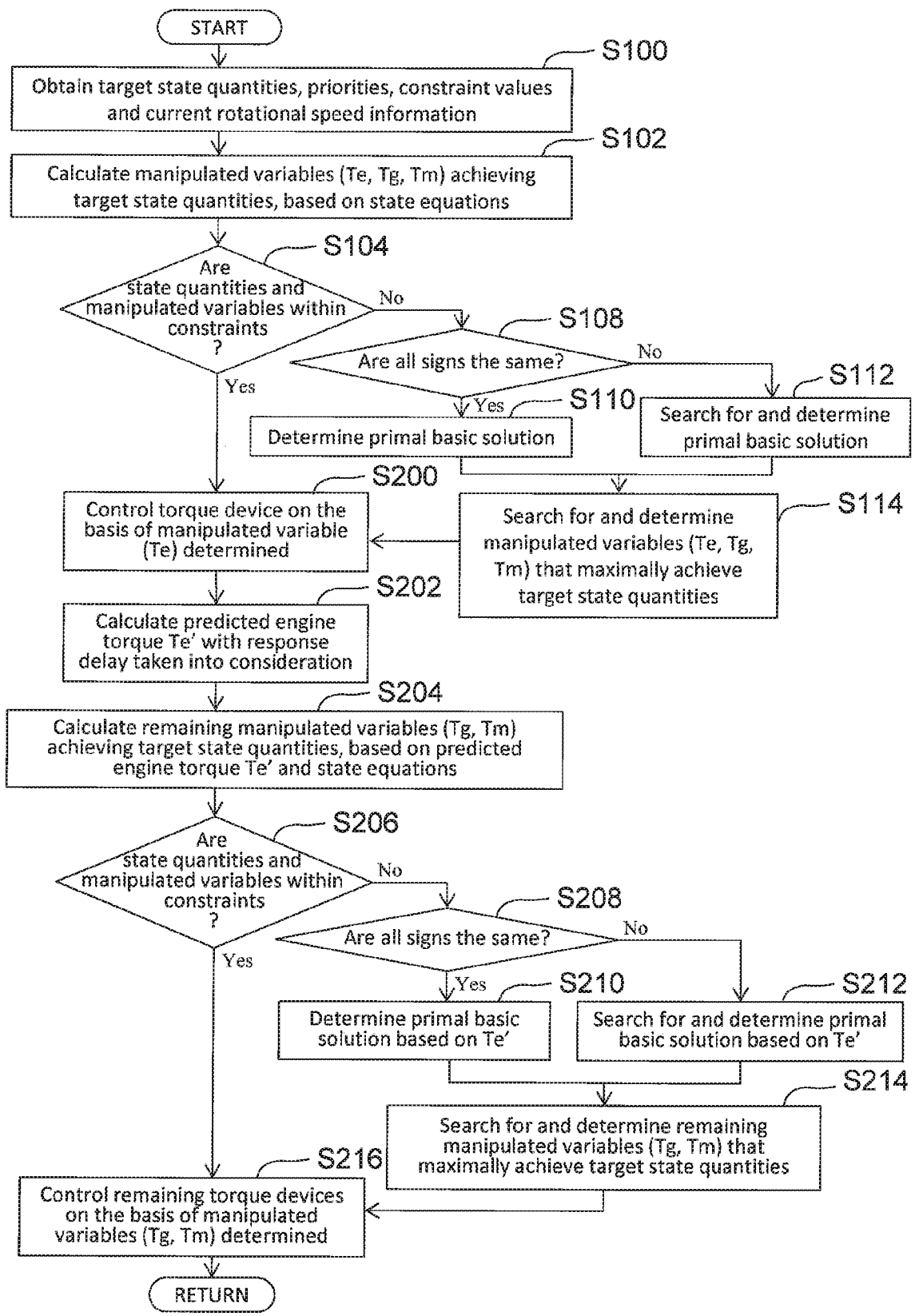
FIG. 8 is a flow chart that illustrates a routine of the processing concerning the torque device control according to the second embodiment of the present disclosure.

FIG. 8 is a flow chart that illustrates a routine of the processing concerning the torque device control according to the second embodiment of the present disclosure. It should be noted that the processing of steps S100 to S104, and S108 to S114 in the routine shown in FIG. 8 (in the present routine, which is performed by the first manipulated variable determination section 72) is as already described in the first embodiment.

According to the routine shown in FIG. 8, the processing of step S200 is performed instead of the processing of step S106. The processing of step S200 is performed by the first manipulated variable determination section 72 and the torque device control section 74 that are described above. That is to say, in step S200, the first manipulated variable determination section 72 commands only the manipulated variable (Te) obtained in step S102 or step S114 to the torque device control section 74, and controls the torque device (internal combustion engine 20) in accordance with the commanded engine torque Te. Thereafter, the processing proceeds to step S202.

The processing of step S202 is performed by the predicted manipulated variable calculation section 76 described above. In step S202, the predicted manipulated variable calculation section 76 calculates the predicted engine torque Te' with the response delay taken into consideration, based on the calculated commanded engine torque Te. When the processing proceeds to step S202 from step S104, the engine torque Te (manipulated variable) calculated in step S102 corresponds to the "calculated commanded engine torque Te" mentioned here. When, on the other hand, the processing proceeds to step S202 from step S114, the engine torque Te (manipulated variable) determined in step S114 corresponds thereto. Thereafter, the processing proceeds to step S204.

The processing of steps S204 to S214 (and S100) is performed by the second manipulated variable determination section 78 described above. First, in step S204, the second manipulated variable determination section 78 calculates the remaining manipulated variables (Tg and Tm) that achieve the target state quantities on the basis of the predicted engine torque Te' calculated in step S202 and the linear state equations (33) mentioned below.

$$\begin{bmatrix} Tp - c11 \cdot Te' \\ Pchg - c21 \cdot Te' \\ dNg - c31 \cdot Te' \end{bmatrix} = \begin{bmatrix} c12 & c13 \\ c22 & c23 \\ c32 & c33 \end{bmatrix} \begin{bmatrix} Tg \\ Tm \end{bmatrix} \quad (33)$$

Formula (33) that is a determinant is based on formula (1) and is obtained by modifying this formula (1) such that the individual terms of the predicted engine torque Te' calculated in step S202 are moved to the left-hand side. The second manipulated variable determination section 78 substitutes the target state quantities obtained in step S100 into the simultaneous equations expressed by formula (33) and solves the simultaneous equations to calculate the remaining manipulated variables (Tg and Tm) that achieve the target state quantities.

Figure 9:
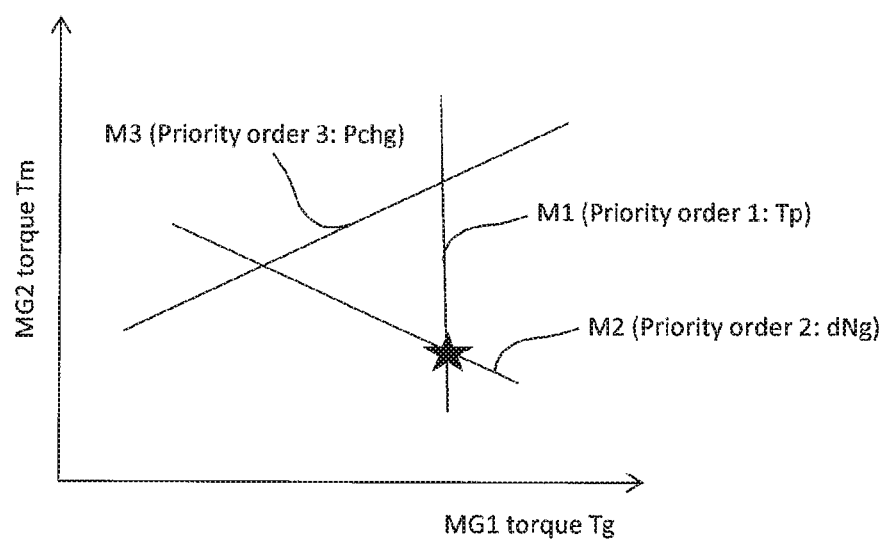
FIG. 9 is a graph used to describe an exemplary manner of calculating the manipulated variables in step S204.

FIG. 9 is a graph used to describe an exemplary manner of calculating the manipulated variables (Tg and Tm) in step S204. In formula (33), unknown manipulated variables are two, that is, the MG1 torque Tg and the MG2 torque Tm, and the number of equations is three. FIG. 9 represents an example of a relationship among three straight lines M1-M3 that satisfy the respective target state quantities (Tp, dNg and Pchg) having the priority orders 1-3 on a two-dimensional plane having unknown manipulated variables (Tg and Tm) as its two axes. In addition, although the number of intersection points among the straight lines M1-M3 that satisfy the three target state quantities may be one (that is, although the manipulated variables (Tg and Tm) that simultaneously satisfy the three target state quantities may be present), the relationship among the three straight lines M1-M3 is typically obtained as shown in FIG. 9.

According to the calculation manner described here, the manipulated variables (Tg and Tm) are calculated by solving two simultaneous equations concerning the target state quantities (Tp and dNg) having the priority orders 1 and 2. As a result, the value of the intersection point (star) between the straight line M1 and the straight line M2 in FIG. 9 is calculated as the manipulated variables (Tg and Tm). According to this kind of calculation manner, the manipulated variables (Tg and Tm) can be calculated such that the two target state quantities that are relatively high in the priority order (priority) are satisfied. Thereafter, the processing proceeds to step S206.

Although the processing of step S206 can be performed on the basis of the same way as the above-described processing of step S104, in more detail it is different from the processing of step S104 in terms of the following points. That is to say, according to this step S206, the state quantities (Tp, Pchg and dNg) achieved by the predicted engine torque Te' calculated in step S202 and the manipulated variables (Tg and Tm) calculated in step S204 are calculated in accordance with the state equations expressed by formula (33). On that basis, it is determined whether each of the state quantities (Tp, Pchg and dNg) calculated in this way and the manipulated variables (Tg and Tm) calculated in step S204 is located within the constraints. If the determination result of step S206 is positive, the processing proceeds to step S216 described below. If, on the other hand, the determination result of step S206 is negative, the second manipulated variable determination section 78 executes the processing of steps S208 to S214 in order to search for and determine, on the premise of using the predicted engine torque Te', the remaining manipulated variables (Tg and Tm) that achieve the target state quantities to the maximum extent possible within the constraints.

In detail, according to the processing of steps S208 to S214, the processing to solve the linear programming problem F' similar to the linear programming problem F described in the first embodiment is performed. The objective function (evaluation function) of this linear programming problem F' is the objective function f shown in formula (2), similarly to the linear programming problem F in the first embodiment. Constraints of the linear programming problem F' are different from those of the routine shown in FIG. 3 as described below. That is to say, constraint formulas used in the linear programming problem F' are obtained by modifying formulas (13)-(21) of the linear programming problem F such that the terms of the engine torque $x_1$ on the left-hand side of each of these formulas are moved to the right-hand side thereof. Formula (22) is omitted. It should be noted that the remaining formulas (12) and (23)-(28) are not changed.

Constraints:

$c_{12}(x_2'-x_2'')+c_{13}(x_3'-x_3'')+y_1^--y_1^+=g_1-c_{11}x_1$ $c_{22}(x_2'-x_2'')+c_{23}(x_3'-x_3'')+y_2^--y_2^+=g_2-c_{21}x_1$ $c_{32}(x_2'-x_2'')+c_{33}(x_3'-x_{31}'')+y_3^--y_3^+=g_3-c_{31}x_1$ $c_{12}(x_2'-x_2'')+c_{13}(x_3'-x_3'')-x_4=Tpmn-c_{11}x_1$ $c_{12}(x_2'-x_2'')+c_{13}(x_3'-x_3'')+x_5=Tpmx-c_{11}x_1$ $c_{22}(x_2'-x_2'')+c_{23}(x_3'-x_3'')-x_6=Win-c_{21}x_1$ $c_{22}(x_2'-x_2'')+c_{23}(x_3'-x_3'')+x_7=Wout-c_{21}x_1$ $c_{32}(x_2'-x_2'')+c_{33}(x_3'-x_3'')-x_8=dNgmn-c_{31}x_1$ $c_{32}(x_2'-x_2'')+c_{33}(x_3'-x_3'')+x_9=dNgmx-x_{31}x_1$ $x_2'-x_2''-x_{11}=Tgmn$ $x_2'-x_2''+x_{12}=Tgmx$ $x_3'-x_3''-x_{13}=Tmmm$ $x_3'-x_3''-x_{14}=Tmmx$ $x_i \geq 0\; i=4,5,6,7,8,9,11,12,13,14$ $x_2',x_2'',x_3',x_3'' \geq 0$ $y_i^-,y_i^+ \geq 0\; i=1,2,3$ To be more specific, according to step S208, the second manipulated variable determination section 78 basically executes a similar determination processing to step S108 on the premise of using the predicted engine torque Te'. However, it is determined in step S108 whether or not the sign of the constraint value Tpmn and the sign of the coefficient (−1) of the variable $x_4$ are the same as each other, whereas in this step S208, it is determined whether or not the sign of a value "Tpmn−$c_{11}$×$x_1$" (=Tpmn−$c_{11}$×Te') and the sign of the coefficient (−1) of the variable $x_4$ are the same as each other. This also applies to the other constraint values Tpmx, Win, Wout, dNgmn and dNgmx. Then, the processing of step S210 or step S212 is executed in accordance with the result of this determination.

The processing of steps S210 and S212 can be basically performed similarly to steps S110 and S112, respectively, except that the predicted engine torque Te' is used. In addition, in step S208, if a value "target value $g_1$−$c_{11}$×$x_{11}$" (which is equal to a value "target value $g_1$−$c_{11}$×Te'") is equal to greater than zero, the variable $y_1^-$ is made equal to the value "target value $g_1-c_{11} \times Te'''$" and the variable $y_1^+$ is made zero. If, on the other hand, the value "target value $g_1-c_{11} \times Te'''$" is negative, the variable $y_1^+$ is made zero and the variable $y_1^+$ is made equal to the "target value $g_1-c_{11} \times Te'''$". This also applies to the relationships between the other variables $y_2^-$, $y_2^+$, $y_3^-$ and $y_3^+$ and the corresponding one of a value "target value $g_2-c_{21} \times x_{11}$" (which is equal to a value "target value $g_2-c_{21} \times Te'''$") and a value "target value $g_3-c_{31} \times x_{11}$" (which is equal to a value "target value $g_3-c_{31} \times Te'''$"). Thereafter, in step S214, the second manipulated variable determination section 78 performs the processing to solve the linear programming problem F' using the primal basic solution obtained by step S210 or S212. As a result, the optimal solution of the remaining manipulated variables (Tg and Tm) based on the predicted engine torque Te' is searched for and determined. Thereafter, the processing proceeds to step S216.

The processing of step S216 is performed by the first manipulated variable determination section 72 and the torque device control section 74. In detail, the first manipulated variable determination section 72 commands, to the remaining torque devices (MG1 30 and MG2 32), the manipulated variables (Tg and Tm) obtained by the processing of step S204 or S214. The torque device control section 74 controls these torque devices in accordance with the commanded manipulated variables (Tg and Tm). Thereafter, the current processing cycle is ended.

2-3. Effects

According to the present embodiment described so far, in the powertrains system including, as its torque devices, the MG1 30, the MG2 32 and the internal combustion engine 20 having a greater response delay than the MG1 30 and MG2 32, the torque device control with the response delay of the internal combustion engine 20 taken into consideration is performed. In detail, first, similarly to the first embodiment, the optimal manipulated variables (Te, Tg and Tm) are obtained by solving the linear programming problem F for all the torque devices (the internal combustion engine 20, the MG1 30 and the MG2 32). Then, the torque device (internal combustion engine 20) whose response delay is greater is controlled in accordance with the obtained manipulated variables (Te), and the predicted engine torque Te' with the response delay taken into consideration is calculated on the basis of this commanded engine torque Te. On the other hand, with regard to the remaining torque devices (MG1 30 and MG2 32), the additional linear programming problem F' based on the predicted engine torque Te' is solved, and, as a result, the optimal manipulated variables (Tg and Tm) associated with the predicted engine torque Te' are obtained. Then, in accordance with the manipulated variables (Tg and Tm) that have been obtained again, these torque devices (MG1 30 and MG2 32) are controlled.

Consequently, according to the torque device control of the present embodiment, even if a torque device (such as the internal combustion engine 20) whose response delay is greater than the other torque devices is included, the linear programming method can be used such that proper manipulated variables of all the torque devices can be determined. In addition, according to the second manipulated variable determination section 78, proper manipulated variables according to the priority of a plurality of target state quantities can also be determined similarly to the first manipulated variable determination section 72.

3. Third Embodiment

Figure 10:
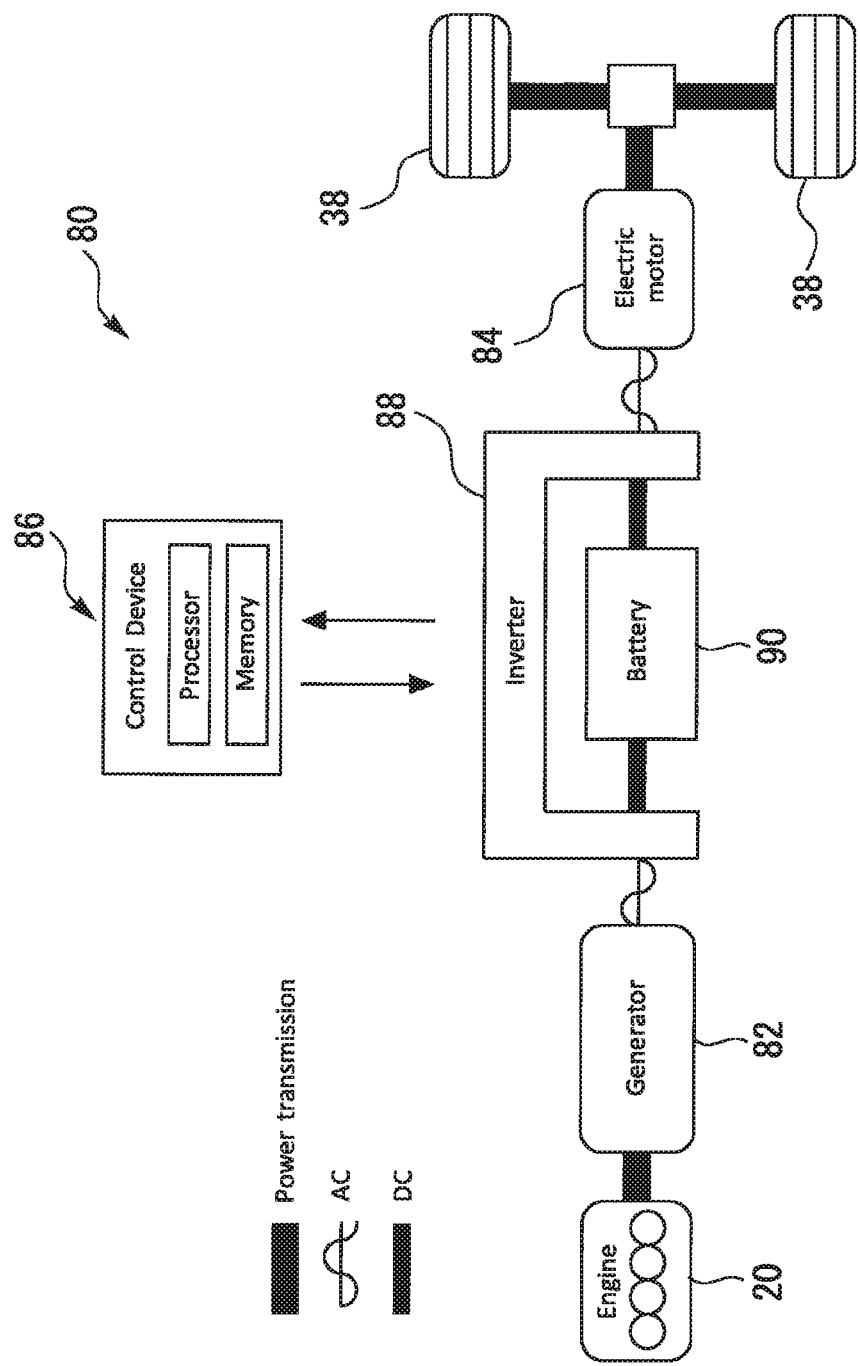
FIG. 10 is a schematic diagram that illustrates an example of the configuration of a powertrain system according to a third embodiment of the present disclosure.

Then, a third embodiment according to the present disclosure will be described with reference to FIG. 10. FIG. 10 is a schematic diagram that illustrates an example of the configuration of a powertrain system 80 according to the third embodiment of the present disclosure. The powertrain system 80 shown in FIG. 10 is provided with a generator 82 and an electric motor 84 as well as the internal combustion engine 20, which correspond to an example of the "one or more torque devices" according to the present disclosure. The powertrain system 80 is further provided with a control device 86 that controls these torque devices. The control device 86 controls an inverter 88 such that the generator 82 performs electric power generation using the engine torque Te. The electric power generated by the generator 82 is stored in a battery 90. The control device 86 controls the inverter 88 such that the electric motor 84 drives the wheels 38 using the electric power stored in the battery 90. As just described, the powertrain system 80 is a so-called series type hybrid system. In addition, according to the example shown in FIG. 10, although the internal combustion engine 20 and the generator 82 do not directly generate the driving force of the vehicle, these correspond to an example of "one or more torque devices associated with the control of the driving force of the vehicle" because they generate the electric power used for the driving of the vehicle.

As an example, the state quantities (control variables) controlled by the powertrain system 80 are the driving torque Tp, the charge/discharge amount Pchg and the rotational speed change rate dNg similarly to the powertrain system 10. Moreover, similarly to the powertrain system 10, the manipulated variables of the torque devices in the present embodiment are the engine torque Te, the torque Tg of the generator 82 and the torque Tm of the electric motor 84. Relationships between control variables and the manipulated variables used in the present embodiment can also be expressed with linear state equations as shown by formula (34) described here.

$$\begin{bmatrix} Tp \\ Pchg \\ dNg \end{bmatrix} = \begin{bmatrix} c11 & c12 & c13 \\ c21 & c22 & c23 \\ c31 & c32 & c33 \end{bmatrix} \begin{bmatrix} Te \\ Tg \\ Tm \end{bmatrix} \quad (34)$$

A similar torque device control to the first or second embodiment may be performed for the above-described powertrain system 80 by the use of the state equations shown as formula (34) and the linear programming method. It should be noted that the objective function may be determined on the basis of a similar way to formula (2). Constraints may also be set properly with regard to each of the state quantities and the manipulated variables in accordance with a similar way to the first embodiment. The reference characters c ($c_{11}$, $c_{12}$, ... ) in formula (34) are constant values that are basically defined in accordance with the hardware specifications, as described in the first embodiment. These also apply to fourth to eighth embodiments described below.

4. Fourth Embodiment

Figure 11:
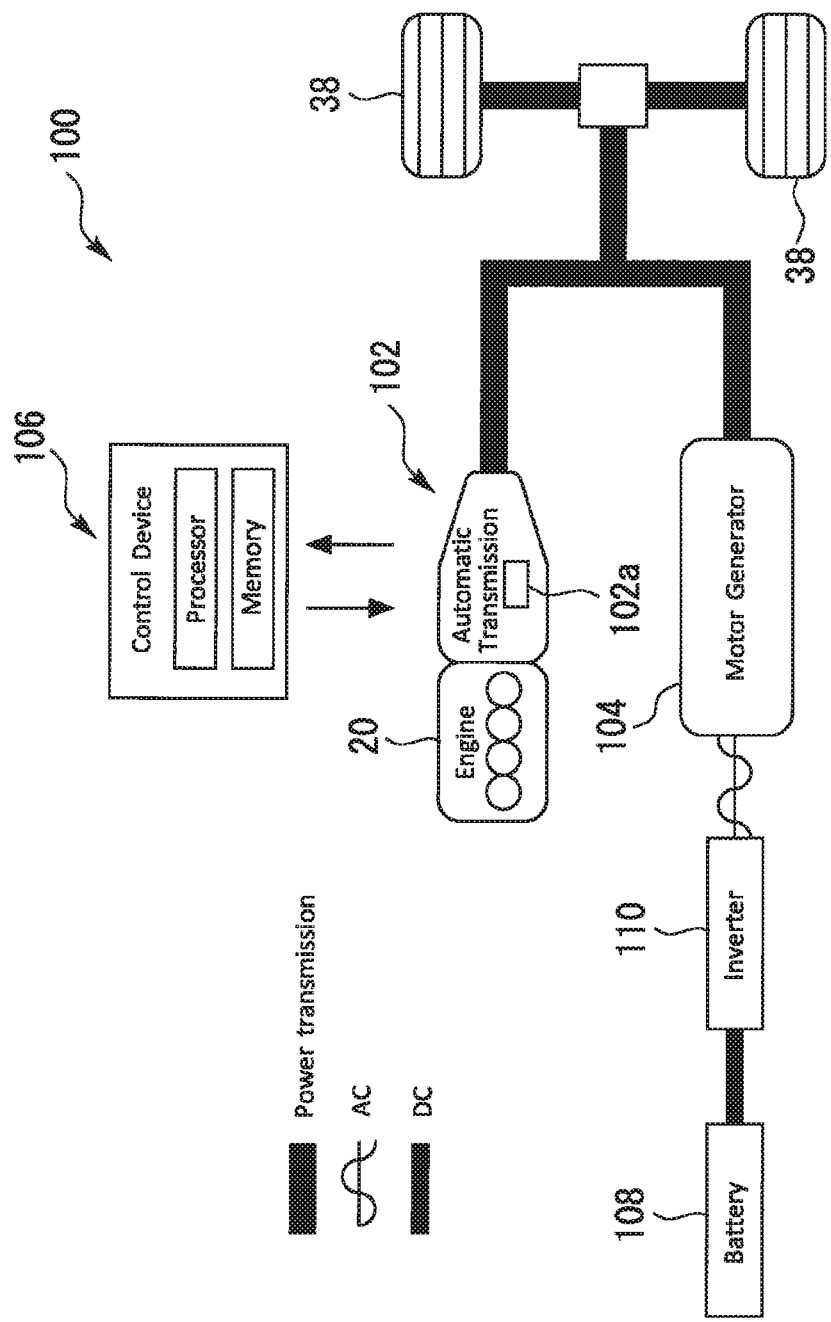
FIG. 11 is a schematic diagram that illustrates an example of the configuration of a powertrain system according to a fourth embodiment of the present disclosure.

Then, a fourth embodiment according to the present disclosure will be described with reference to FIG. 11. FIG. 11 is a schematic diagram that illustrates an example of the configuration of a powertrain system 100 according to the fourth embodiment of the present disclosure. According to the powertrain system 100 shown in FIG. 11, the internal combustion engine 20 combined with a stepped automatic transmission 102 is coupled in parallel to a motor generator 104. In this example, the automatic transmission 102 and the motor generator 104 as well as the internal combustion engine 20 correspond to "one or more torque devices associated with the control of the driving force of the vehicle".

To be more specific, the wheels 38 can be driven using a torque transmitted from the internal combustion engine 20 via the automatic transmission 102 and a torque Tmg of the motor generator 104. The electric power required to generate the motor generator torque Tmg is supplied from a battery 108. A control device 106 for controlling the individual torque devices controls an inverter 110 such that the motor generator 104 performs an electric power generation using the internal combustion engine 20 and a regenerative power generation during the deceleration of the vehicle. The electric power generated as a result is stored in the battery 108. As just described, the powertrain system 100 is a so-called parallel type hybrid system.

Then, linear state equations used for the determination of manipulated variables using the linear programming method by the control device 106 will be described. The automatic transmission 102 is built in a plurality of clutches 102a and is configured so as to control engagement/disengagement of these clutches 102a to switch the gear position. As an example, state quantities (control variables) and the manipulated variables that are controlled by the powertrain system 100 are different depending on whether the vehicle is during the normal time (non-shifting time) or during the shifting time, as described below.

In detail, as shown in formula (35) described below, during the normal time (non-shifting time), the driving torque Tp and the charge/discharge amount Pchg are used as the state quantities, and the engine torque Te and the motor generator torque Tmg are used as the manipulated variables. It should be noted that, when the gear position is changed, the inertia and gear ratios changes and, as a result, a part of the constant values c ($c_{11}, c_{12}, \ldots$) in formulas (35) and (36) changes. This also applies to formulas (37)-(42) described below.

$$\text{Normal Time:} \begin{bmatrix} Tp \\ Pchg \end{bmatrix} = \begin{bmatrix} c11 & c12 \\ c21 & c22 \end{bmatrix} \begin{bmatrix} Te \\ Tmg \end{bmatrix} \quad (35)$$

On the other hand, as shown in formula (36) described below, the state quantities used at the time of the shifting include a rotational speed change rate dω in addition to the driving torque Tp and the charge/discharge amount Pchg. An example of the rotational speed change rate dω is an engine speed change rate dNe, or a rotational speed change rate of an input shaft of the automatic transmission 102 may be used instead thereof. In addition, the manipulated variables include Tcr and Tce in addition to the engine torque Te and the motor generator torque Tmg. Tcr corresponds to a torque capacity of a clutch among the plurality of clutches 102a of the automatic transmission 102, which is released during the shifting. Tee corresponds to a torque capacity of a clutch among them, which is engaged during the shifting.

Shifting Time:

$$\begin{bmatrix} Tp \\ Pchg \\ d\omega \end{bmatrix} = \begin{bmatrix} c11 & c12 & c13 & c14 \\ c21 & c22 & c23 & c24 \\ c31 & c32 & c33 & c34 \end{bmatrix} \begin{bmatrix} Te \\ Tmg \\ Tcr \\ Tce \end{bmatrix} \quad (36)$$

5. Fifth Embodiment

Figure 12:
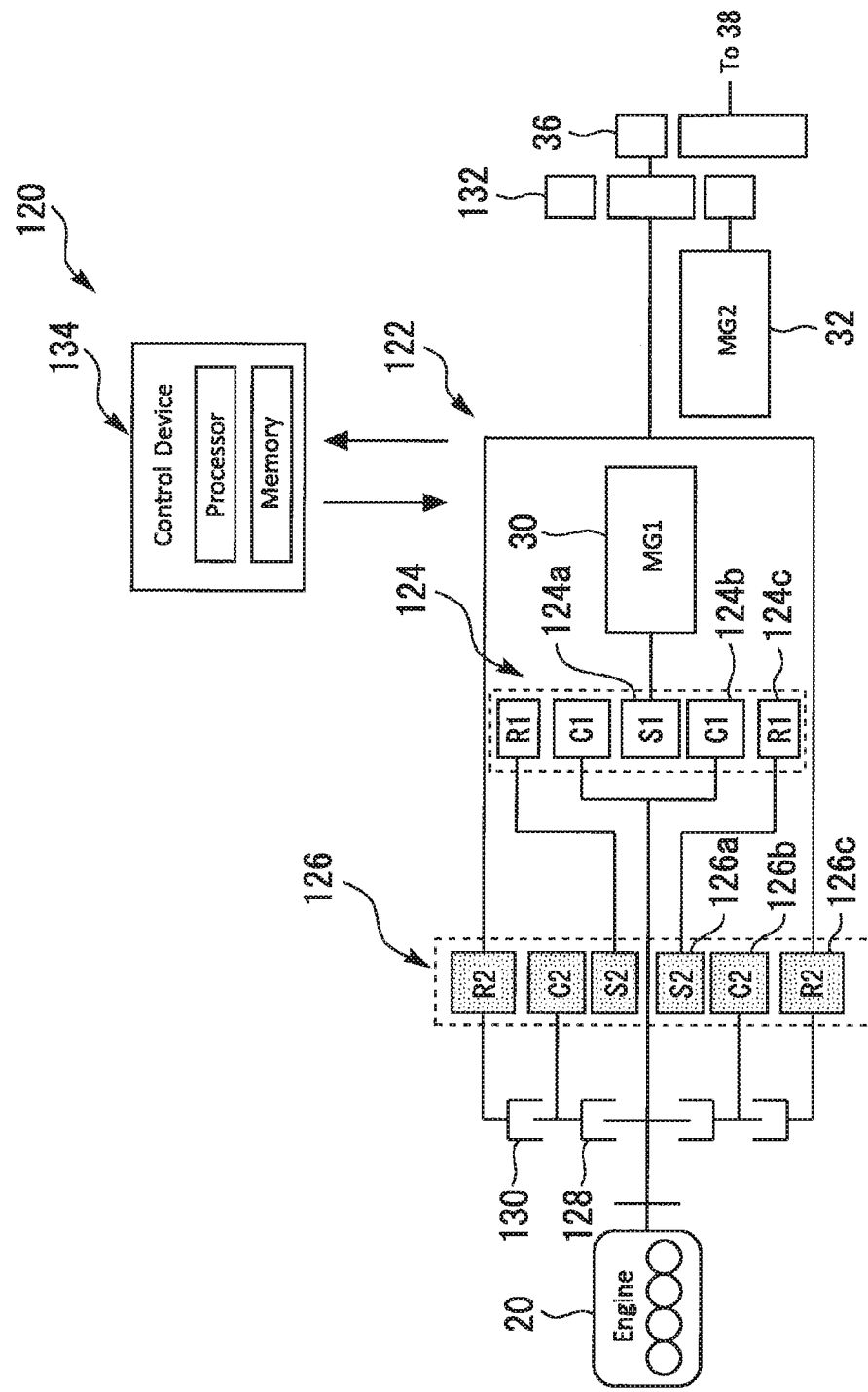
FIG. 12 is a schematic diagram that illustrates an example of the configuration of a powertrain system according to a fifth embodiment of the present disclosure.

Then, a fifth embodiment according to the present disclosure will be described with reference to FIG. 12. FIG. 12 is a schematic diagram that illustrates an example of the configuration of a powertrain system 120 according to the fifth embodiment of the present disclosure. Torque devices which the powertrain system 120 shown in FIG. 12 includes are the internal combustion engine 20, the MG1 30 and the MG2 32 similarly to the powertrain system 10. The powertrain system 120 is different from the powertrain system 10 in terms of the configuration of a power split device 122. The power split device 122 includes a first planetary gear unit 124, a second planetary gear unit 126, a low-speed clutch 128, a high-speed clutch 130 and a speed reducer 132. A control device 134 controls the torque devices described above. It should be noted that, in FIG. 12, illustration of an inverter and a battery is omitted.

To be more specific, the first planetary gear unit 124 includes a first sun gear 124a (S1), a first planetary carrier 124b (C1) and a first ring gear 124c (R1). The second planetary gear unit 126 includes a second sun gear 126a (S2), a second planetary carrier 126b (C2) and a second ring gear 126c (R2). The first sun gear 124a is coupled to the MG1 30, and the first planetary carrier 124b is coupled to the internal combustion engine 20. In contrast to the power split device 34 shown in FIG. 1, the ring gear 124c is coupled to the second sun gear 126a and can rotate integrally with the second sun gear 126a.

The low-speed clutch 128 is configured to be engageable with the second sun gear 126a and the second planetary carrier 126b. The high-speed clutch 130 is configured to be engageable with the second planetary carrier 126b and the second ring gear 126c. An example of these clutches 128 and 130 is a dog clutch. The second ring gear 126c is coupled to the speed reducer 132. Moreover, the MG2 32 is also coupled to the speed reducer 132. The speed reducer 132 is configured to reduce the rotational speed of the MG2 32 with respect to the rotational speed of an output shaft of the second ring gear 126c. The torque from the second ring gear 126c and the MG2 32 torque Tm are transmitted to the wheels 38 via the speed reducer 132 and the speed reducer 36. As above, the powertrain system 120 is a power-split type hybrid system similarly to the powertrain system 10.

According to the powertrain system 120 described above, the gear shifting can be performed by controlling engagement/disengagement of the clutches 128 and 130. In detail, when the low-speed clutch 128 is engaged, the second sun gear 126a and the second planetary carrier 126b become able to rotate together, and, when, on the other hand, the high-speed clutch 130 is engaged, the second planetary carrier 126b and the second ring gear 126c become able to rotate together. The second planetary gear unit 126 is configured (i.e., gear ratios thereof are selected) so as to increase the speed of the output shaft of the second ring gear 126c when the high-speed clutch 130 is engaged and the low-speed clutch 128 is released (i.e., in a high-speed mode) as compared to when the low-speed clutch 128 is engaged and the high-speed clutch 130 is released (i.e., in a low-speed mode).

Then, linear state equations used by a control device 134 to determine the manipulated variables using the linear programming method will be described. The state quantities (control variables) and the manipulated variables that are controlled by the present powertrain system 120 are also different depending on whether the vehicle is during the normal time (non-shifting time) or during the shifting time, as an example shown below.

In detail, as shown in formula (37) described below, similarly to the powertrain system 10, the control variables used during the normal time (non-shifting time) are the driving torque Tp, the charge/discharge amount Pchg and the rotational speed change rate dNg, and the manipulated variables are the engine torque Te, the MG1 torque Tg and the MG2 torque Tm.

$$\text{Normal Time:} \begin{bmatrix} Tp \\ Pchg \\ dNg \end{bmatrix} = \begin{bmatrix} c11 & c12 & c13 \\ c21 & c22 & c23 \\ c31 & c32 & c33 \end{bmatrix} \begin{bmatrix} Te \\ Tg \\ Tm \end{bmatrix} \quad (37)$$

On the other hand, as shown by formula (38) described below, the control variables used during the shifting include Txl and Txh in addition to the driving torque Tp, the charge/discharge amount Pchg and the rotational speed change rate dNg. Txl is a transmitted torque (i.e., allotted torque) that the low-speed clutch 128 needs to handle when the low-speed mode is selected, and Txh is a transmitted torque (i.e., allotted torque) that the high-speed clutch 130 needs to handle when the high-speed mode is selected. The manipulated variables used during the shifting time are the same as those of the normal time.

$$\text{Shifting Time:} \begin{bmatrix} Tp \\ Pchg \\ dNg \\ Txl \\ Txh \end{bmatrix} = \begin{bmatrix} c11 & c12 & c13 \\ c21 & c22 & c23 \\ c31 & c32 & c33 \\ c41 & c42 & c43 \\ c51 & c52 & c53 \end{bmatrix} \begin{bmatrix} Te \\ Tg \\ Tm \end{bmatrix} \quad (38)$$

Additionally, in the example of the shifting time shown in formula (38), the number of the control variables are five and the number of the manipulated variables are three. Even in examples in which the number of the control variables are greater than the number of the manipulated variables in this way, it is possible to solve a linear programming problem mathematically while prioritizing all of the five control variables. Because of this, the linear programming problem may be solved using all of the five state quantities as target state quantities as shown in formula (38). On the other hand, the number of the control variables that can be explicitly (directly) controlled is three, which is the same as the number of the manipulated variables. Accordingly, the linear programming problem may be solved by excluding the fourth and fifth control variables in the priority order from formula (38) (that is, by aligning the number of the control variables and the number of the manipulated variables). As a result, optimal manipulated variables can be determined while reducing the calculation load. This also applies to an example (see formula (40)) of a linear programming problem for the shifting time in the following sixth embodiment.

6. Sixth Embodiment

Figure 13:
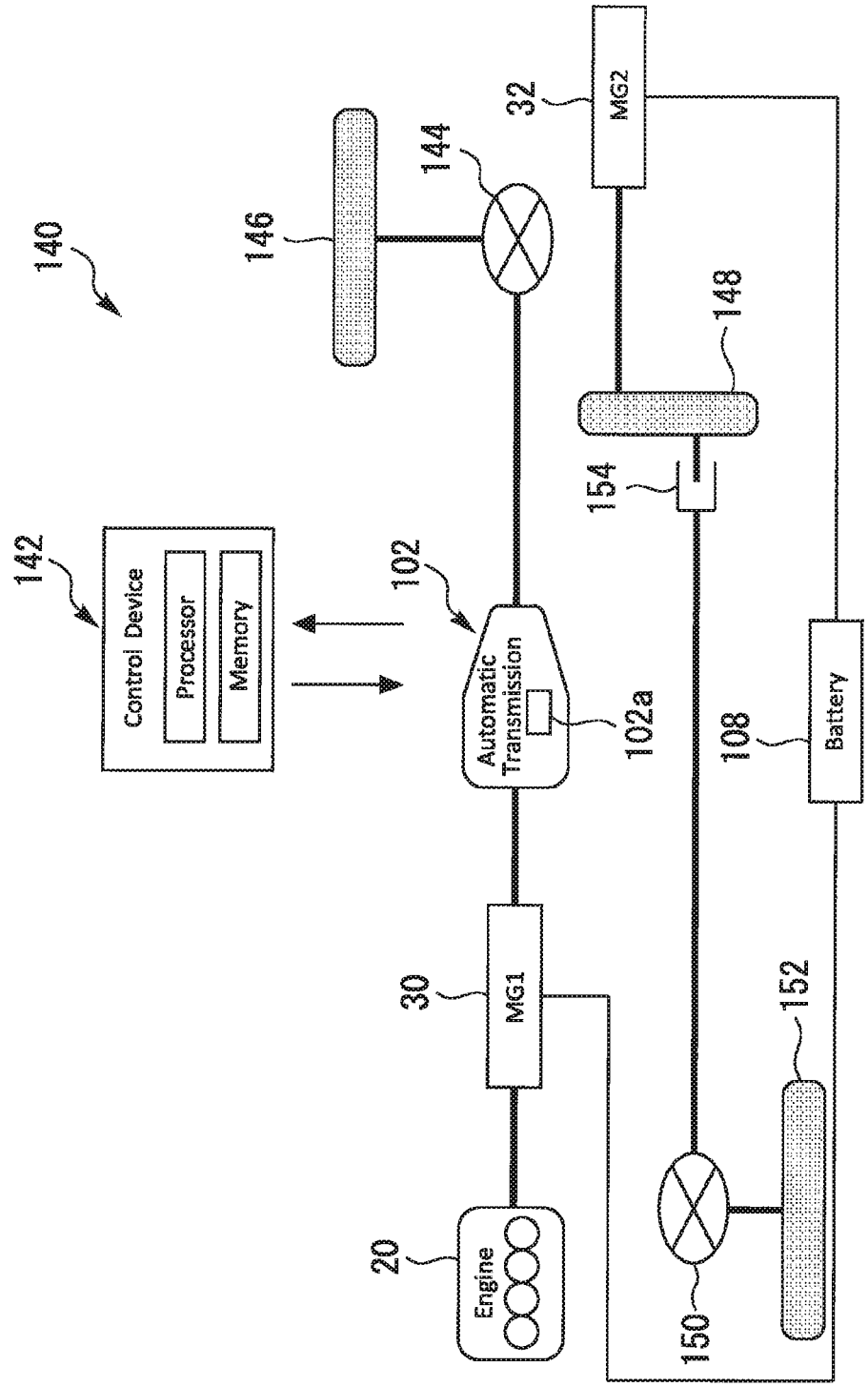
FIG. 13 is a schematic diagram that illustrates an example of the configuration of a powertrain system according to a sixth embodiment of the present disclosure.

Then, a sixth embodiment according to the present disclosure will be described with reference to FIG. 13. FIG. 13 is a schematic diagram that illustrates an example of the configuration of a powertrain system 140 according to the sixth embodiment of the present disclosure. The powertrain system 140 shown in FIG. 13 is provided with the internal combustion engine 20, the MG1 30, the MG2 32 and the automatic transmission 102, which correspond to torque devices controlled by a control device 142. It should be noted that, in FIG. 13, illustration of an inverter is omitted.

To be more specific, the MG1 30 is arranged between the internal combustion engine 20 and the automatic transmission 102. An output shaft of the automatic transmission 102 is coupled to rear wheels 146 with a differential gear 144 interposed therebetween. The rear wheels 146 can be driven by the internal combustion engine 20. In addition, the rear wheels 146 can also be driven by the MG1 that functions as an electric motor. The MG1 30 also functions as a generator and can perform an electric power generation using the internal combustion engine 20 and a regenerative power generation during the deceleration of the vehicle. On the other hand, the MG2 32 is coupled to front wheels 152 with a speed reducer 148 and a differential gear 150 that are interposed therebetween. A dog clutch 154 is arranged between the speed reducer 148 and the differential gear 150. The MG2 32 can drive the front wheels 152 when it functions as an electric motor, and can also perform a regenerative power generation when it functions as a generator during the deceleration of the vehicle. A battery 108 receives the supply of the electric power from the MG1 30 and the MG2 32 that each function as a generator, and supplies an electric power to the MG1 30 and the MG2 32 that each function as an electric motor. In this way, the powertrain system 140 is a so-called series-parallel type hybrid system.

Then, linear state equations used by a control device 142 to determine the manipulated variables using the linear programming method will be described. The state quantities (control variables) and the manipulated variables that are controlled by the present powertrain system 140 are different depending on whether the vehicle is during the normal time (non-shifting time) or during a shifting time associated with a clutch operation, as an example shown below.

In detail, as shown by formula (39) described below, the control variables used during the normal time (non-shifting time) are a driving torque Tpf of the front wheels 152, a driving torque Tpr of the rear wheels 146, and the charge/discharge amount Pchg. The manipulated variables are the engine torque Te, an MG1 torque Tmg1 and an MG2 torque Tmg2.

$$\text{Normal Time:} \begin{bmatrix} Tpf \\ Tpr \\ Pchg \end{bmatrix} = \begin{bmatrix} c11 & c12 & c13 \\ c21 & c22 & c23 \\ c31 & c32 & c33 \end{bmatrix} \begin{bmatrix} Te \\ Tmg1 \\ Tmg2 \end{bmatrix} \quad (39)$$

On the other hand, as shown by formula (40) described below, the control variables used during the shifting time associated with a clutch operation include the MG1 rotational speed change rate dNg, the MG2 rotational speed change rate dNm and Tx in addition to the driving torques Tpf and Tpr and the charge/discharge amount Pchg. Tx is a transmitted torque (i.e., allotted torque) that the dog clutch 154 needs to handle. In addition, the manipulated variables include the individual clutch capacities (torque capacities) Tcr and Tce of the automatic transmission 102 in addition to the engine torque Te, the MG1 torque Tmg1 and the MG2 torque Tmg2.

Shifting Time: (40)

$$\begin{bmatrix} Tpf \\ Tpr \\ Pchg \\ dNg \\ dNm \\ Tx \end{bmatrix} = \begin{bmatrix} c11 & c12 & c13 & c14 & c15 \\ c21 & c22 & c23 & c24 & c25 \\ c31 & c32 & c33 & c34 & c35 \\ c41 & c42 & c43 & c44 & c45 \\ c51 & c52 & c53 & c54 & c55 \\ c61 & c62 & c63 & c64 & c65 \end{bmatrix} \begin{bmatrix} Te \\ Tmg1 \\ Tmg2 \\ Tcr \\ Tce \end{bmatrix}$$

7. Seventh Embodiment

Then, a seventh embodiment according to the present disclosure will be described. A powertrain system (not shown) according to the present embodiment is provided with only the internal combustion engine 20 as a power source of the vehicle. In more detail, according to this powertrain system, the internal combustion engine 20 is combined with the automatic transmission 102 (see FIG. 11) as an example.

Furthermore, linear state equations used by a control device according to the present embodiment to determine the manipulated variable using the linear programming method will be described. As shown by formula (41) described below, a state quantity used during the normal time (non-shifting time) is the driving torque Tp, and a manipulated variable is the engine torque Te. On the other hand, as shown by formula (42) described below, the control variables used during the shifting time include the engine speed change rate dNe in addition to the driving torque Tp. In addition, the manipulated variables include a torque capacity Tcr of a clutch released during the shifting of the automatic transmission 102 and a torque capacity Tce of a clutch engaged during the shifting, in addition to the engine torque Te.

Normal Time: $Tp = c11 \cdot Te$ (41)

Shifting Time: $\begin{bmatrix} Tp \\ dNe \end{bmatrix} = \begin{bmatrix} c11 & c12 & c13 \\ c21 & c22 & c23 \end{bmatrix} \begin{bmatrix} Te \\ Tcr \\ Tce \end{bmatrix}$ (42)

8. Eighth Embodiment

Then, an eighth embodiment according to the present disclosure will be described. A powertrain system (not shown) according to the present disclosure is provided with only the motor generator 104 (see FIG. 11) as a power source of the vehicle. In this example, the motor generator 104 is driven using an electric power supplied from an external power source and an electric power supplied from a battery (not shown) that stores an electric power generated by a regenerative power generation using the motor generator 104 during the deceleration of the vehicle.

Furthermore, a linear state equation used by a control device according to the present embodiment to determine a manipulated variable using the linear programming method will be described. As shown by formula (43) described below, the control variable is the driving torque Tp and the manipulated variable is a motor generator torque Tmg.

$Tp = c11 \cdot Tmg$ (43)

9. Ninth Embodiment

Then, a ninth embodiment according to the present disclosure will be described with reference to FIG. 14.

9-1. Issue on Powertrain System According to First to Eighth Embodiments

According to the first embodiment (similarly, according to the second to eighth embodiments), it is required to always satisfy the constraints (see formulas (6)-(8)) concerning the upper and lower limits of the individual control variables (Tp, Pchg and dNg) in calculating the manipulated variables (Te, Tg and Tm) while minimizing the deviation from the target values of the control variables. As a result, even if the individual manipulated variables are moved freely within those constraints (see formulas (9)-(11)), the constraints concerning the upper and lower limits of the control variables may no longer be satisfied. When the constraints concerning the upper and lower limits of the control variables are not satisfied in calculating the manipulated variables, there is no solution (feasible solution) of the linear programming problem F. Because of this, an optimal manipulated variable searcher (in the example of the first embodiment, the manipulated variable determination section 58) for solving the linear programming problem F can no longer determine the manipulated variables.

Figure 14:
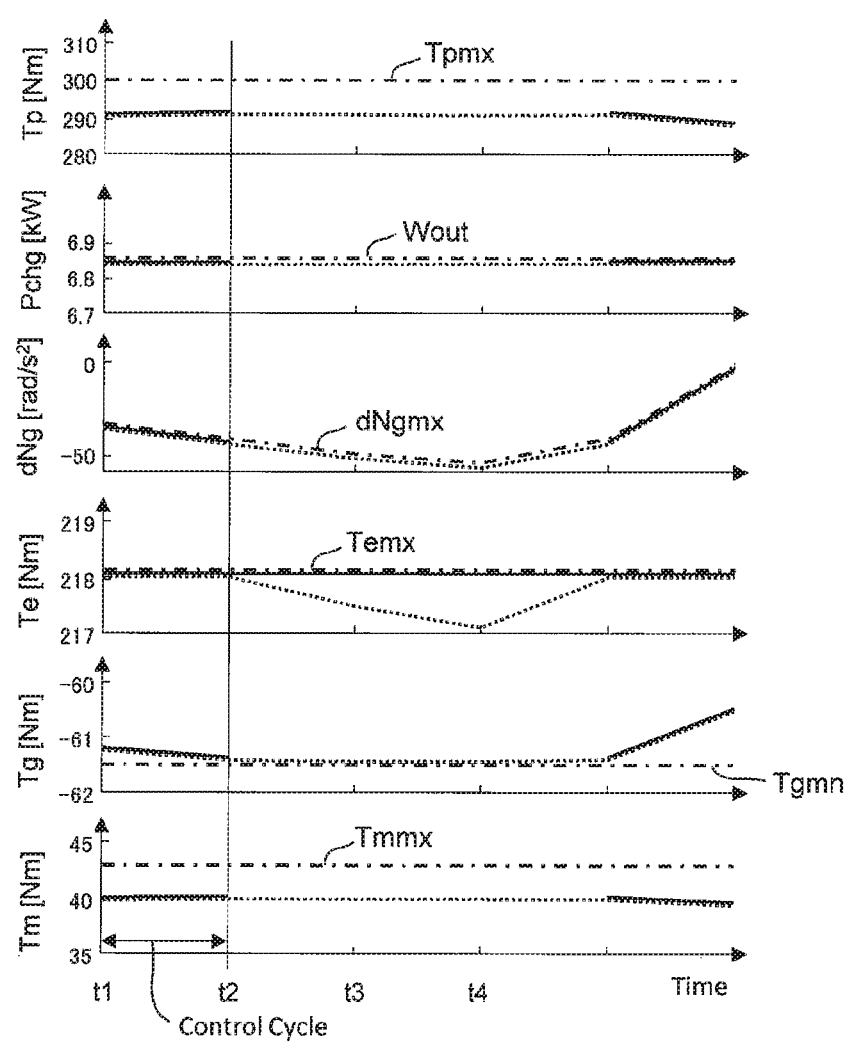
FIG. 14 is a time chart that illustrates an example of situations in which constraints concerning upper and lower limits of control variables are not satisfied.

FIG. 14 is a time chart that illustrates an example of situations in which the constraints concerning the upper and lower limits of the control variables are not satisfied. It should be noted that an operation example shown in FIG. 14 is based on the powertrain system according to the second embodiment in which the manipulated variables (Te, Tg and Tm) are determined with a response delay of the engine torque Te taken into consideration. Broken lines in FIG. 14 are associated with the manipulated variables (Te, Tg and Tm) determined by the first manipulated variable determination section 72 (see FIG. 7) and the control variables (Tp, Pchg and dNg) at the time point of this determination. Solid lines in the same drawing are associated with the manipulated variables (Tg and Tm) determined by the second manipulated variable determination section 78 (see FIG. 7) and the control variables (Tp, Pchg and dNg) at the time point of this determination. One-dot lines in the same drawing are associated with the upper and lower limit constraint values of the respective control variables and manipulated variables. One division (i.e., a time interval between adjacent sampling time points) on the horizontal axis in FIG. 14 corresponds to a control cycle of the torque devices.

According to the example shown in FIG. 14, in a time period (t1 to t4), the rotational speed change rate dNg takes the upper limit constraint value dNgmx, and this upper limit constraint value dNgmx is decreasing while taking negative values. Because of this, in this time period, it is required to decrease the MG1 rotational speed Ng in order to continuously satisfy the constraint of the rotational speed change rate dNg.

In the powertrain system having the hardware configuration shown in FIG. 1, in order to decrease the MG1 rotational speed Ng, it is required to decrease the MG1 torque (i.e., increase the MG1 torque on the negative side) or to decrease the engine torque Te. At the sampling time point t2, calculation of the manipulated variables (Te, Tg and Tm) is achieved while decreasing the MG1 torque Tg in order to satisfy the constraint of the rotational speed change rate dNg.

At the sampling time point t2, the MG1 torque Tg is reached to the lower limit constraint value Tgmn thereof. Thus, at the following sampling time point t3, the first manipulated variable determination section 72 commands to decrease the engine torque Te in order to continuously satisfy the constraint of the rotational speed change rate dNg (broken line). As already described, since the engine torque Te generated has a response delay, the engine torque Te does not decrease immediately. The second manipulated variable determination section 78 is configured to calculate the manipulated variables (Tg and Tm) in accordance with the predicted engine torque Te' (solid line) with this kind of response delay of the engine torque Te taken into consideration. However, no matter how the remaining manipulated variables (Tg and Tm) are controlled under this predicted engine torque Te', the constraint of the rotational speed change rate dNg cannot be satisfied. Because of this, the second manipulated variable determination section 78 cannot determine the manipulated variables (Tg and Tm) at the sampling time point t3. This also applies to the sampling time point t4.

9-2. Example of Setting of Objective Function and Constraints According to Ninth Embodiment A powertrain system according to the ninth embodiment is different from the powertrain system 10 according to the first embodiment in terms of the following points. In detail, in view of the issue described above, according to the present embodiment, the manner of formulation of the objective function and the constraints used to determine the manipulated variables (Te, Tg and Tm) is changed as follows, as compared to the first embodiment.

Formula (44) described below represents an example of an objective function (evaluation function) f' of a linear programming problem used by the manipulated variable determination section 58 to determine the manipulated variables in the present embodiment. In addition, formulas (3)-(5), (9)-(11), and (45)-(51) described below represent an example of the constraints used along with this objective function f'.

Minimization: $f' = P_1(y_1^- + y_1^+) + P_2(y_2^- + y_2^+) + P_3(y_3^- + y_3^+) + P_4(y_4^- + y_5^+) + P_5(y_6^- + y_7^+) + P_6(y_8^- + y_9^+)$ (44)

Constraints:

$c_{11}x_1 + c_{12}x_2 + c_{13}x_3 + y_1^- - y_1^+ = g_1$ (3)

$c_{21}x_1 + c_{22}x_2 + c_{23}x_3 + y_2^- - y_2^+ = g_2$ (4)

$c_{31}x_1 + c_{32}x_2 + c_{33}x_3 + y_3^- - y_3^+ = g_3$ (5)

$c_{11}x_1 + c_{12}x_2 + c_{13}x_3 + y_4^- - y_4^+ = Tpmn$ (45)

$c_{11}x_1 + c_{12}x_2 + c_{13}x_3 + y_5^- - y_5^+ = Tpmx$ (46)

$c_{21}x_1 + c_{22}x_2 + c_{23}x_3 + y_6^- - y_6^+ = Win$ (47)

$c_{21}x_1 + c_{22}x_2 + c_{23}x_3 + y_7^- - y_7^+ = Wout$ (48)

$c_{31}x_1 + c_{32}x_2 + c_{33}x_3 + y_8^- - y_8^+ = dNgmn$ (49)

$c_{31}x_1 + c_{32}x_2 + c_{33}x_3 + y_9^- - y_9^+ = dNgmx$ (50)

$0 \leq x_1 \leq Temx$ (9)

$Tgmn \leq x_2 \leq Tgmx$ (10)

$Tmmn \leq x_3 \leq Tmmx$ (11)

$y_i^-, y_i^+ \geq 0 (i=1,2,\ldots,9)$ (51)

As described above, according to the constraints used in the present embodiment, formulas (45)-(50) concerning the upper and lower limit constraint values of the respective control variables (Tp, Pchg and dNg) are changed from formulas (6)-(8) used in the first embodiment. Moreover, in accompaniment with this, formula (12) is changed as shown by formula (51). To be more specific, reference characters $y_i^-$ and $y_i^+$ (i=4 to 9) in formulas (45)-(50) are as follows.

$y_4^-$: an excess amount of the driving torque Tp with respect to the lower limit constraint value Tpmn $y_4^+$: a margin amount of the driving torque Tp with respect to the lower limit constraint value Tpmn $y_5^-$: a margin amount of the driving torque Tp with respect to the upper limit constraint value Tpmx $y_5^+$: an excess amount of the driving torque Tp with respect to the upper limit constraint value Tpmx $y_6^-$: an excess amount of the charge/discharge amount Pchg with respect to the lower limit constraint value Win $y_6^+$: a margin amount of the charge/discharge amount Pchg with respect to the lower limit constraint value Win $y_7^-$: a margin amount of the charge/discharge amount Pchg with respect to the upper limit constraint value Wout $y_7^+$: an excess amount of the charge/discharge amount Pchg with respect to the upper limit constraint value Wout $y_8^-$: an excess amount of the rotational speed change rate dNg with respect to the lower limit constraint value dNgmn $y_8^+$: a margin amount of the rotational speed change rate dNg with respect to the lower limit constraint value dNgmn $y_9^-$: a margin amount of the rotational speed change rate dNg with respect to the upper limit constraint value dNgmx $y_9^+$: an excess amount of the rotational speed change rate dNg with respect to the upper limit constraint value dNgmx By the use of formulas (45)-(50) including the excess and margin amounts $y_i^-$ and $y_i^+$ (i=4-9) described above, the upper and lower constraints of the control variables are changed to equality constraints from inequality constraints according to formulas (6)-(8). It should be noted that, in the present embodiment, it is also required to always satisfy the constraints (see formulas (9)-(11) described above) concerning the upper and lower limits of the manipulated variables (Te, Tg and Tm) similarly to the other embodiments, such as the first embodiment.

On that basis, the objective function f' according to the present embodiment has not only the same three terms as the right-hand side in formula (2) (i.e., three terms of the amounts of deviation of the individual control variables with respect to the target values) but also three terms regarding the excess amounts of the individual control variables with respect to the constraints. To be more specific, with regard to the latter three terms, the sum ($y_4^-$ and $y_5^+$) of two excess amounts $y_4^-$ and $y_5^+$ collectively indicates the excess amount of the driving torque Tp with respect to the lower limit constraint value Tpmn or the upper limit constraint value Tpmx. Reference character $P_4$ corresponds to the priority of these excess amounts ($y_4^-$ and $y_5^+$). Similarly, the sum ($y_6^-$ and $y_7^+$) corresponds to the excess amount of the charge/discharge amount Pchg with respect to the lower limit constraint value Win or the upper limit constraint value Wout, and reference character $P_5$ corresponds to the priority of these excess amounts ($y_6^-$ and $y_7^+$). The sum ($y_8^-$ and $y_9^+$) corresponds to the excess amounts of the rotational speed change rate dNg with respect to the lower limit constraint value dNgmn or the upper limit constraint value dNgmx, and reference character $P_6$ corresponds to the priority of these excess amounts ($y_8^-$ and $y_9^+$).

Furthermore, according to the present embodiment, the priorities $P_1$-$P_6$ are set as follows as an example. That is to say, the priorities $P_4$-$P_6$ concerning the compliance of the individual constraint values (the plurality of constraints) are set so as to become higher than the priorities $P_1$-$P_3$ concerning the achievement of the target values of the respective control variables (that is, $P_4$-$P_6$>$P_1$-$P_3$). Which priority is higher among the priorities $P_4$-$P_6$ can be freely set, and similarly, which priority is higher among the priorities $P_1$-$P_3$ can be freely set. As an example, with regard to the priorities $P_4$-$P_6$, the priority $P_4$ of the driving torque Tp becomes the highest, the priority $P_6$ of the rotational speed change rate dNg becomes the second highest, and the priority $P_5$ of the charge/discharge amount Pchg becomes the lowest ($P_4$>$P_6$>$P_5$). An example of the setting of the priorities $P_1$-$P_3$ is the same as that according to the first embodiment ($P_1$>$P_3$>$P_2$).

A specific example of the priorities $P_4$-$P_6$ in the objective function f' according to the present embodiment is the priority order based on a similar manner to the first embodiment. Furthermore, as another specific example of the priorities $P_1$-$P_6$, the weight may be used as already described. On that basis, as a manner of determining the manipulated variables (Te, Tg and Tm) by solving the linear programming problem of the present embodiment that uses the objective function f' shown by formula (44) and the constraints shown by formulas (3)-(5), (9)-(11), and (45)-(51), the manner described in the first embodiment can be used, for example.

9-3. Effects

By the use of the objective function f' and the constraints according to the present embodiment described above, the manipulated variable determination section 58 determines the manipulated variables (Te, Tg and Tm) such that each shown in formula (44) becomes smaller in descending order of the priorities $P_1$-$P_6$. With regard to this kind of determination of the manipulated variables (Te, Tg and Tm), the following can be said based on three terms of excess amounts ($P_4$ ($y_4^-$+$y_5^+$), $P_5$ ($y_6^-$+$y_7^+$) and $P_6$ ($y_8^-$+$y_9^+$)) concerning the constraint values. That is to say, minimization of each excess amount can be achieved in descending order of the priorities $P_4$-$P_6$. That is to say, each excess amount becomes difficult to be minimized in ascending order of the priorities $P_4$-$P_6$. As a result, when the manipulated variables are determined, the individual excess amounts become greater in ascending order of the priorities $P_4$-$P_6$.

Therefore, according to the present embodiment, when the manipulated variables are unable to be determined while complying with a plurality of constraints concerning the constraint values (more specifically, when the manipulated variables are unable to be determined while complying with formulas (6)-(11) according to the first embodiment), the manipulated variable determination section 58 (which corresponds to an example of the "first manipulated variable determination section" according to the present disclosure) performs the following processing. That is to say, the manipulated variables (Te, Tg and Tm) are determined while relaxing the plurality of constraints in ascending order of the priorities $P_4$-$P_6$. By relaxing the constraints in this way as needed, it becomes possible to avoid that the manipulated variables are unable to be determined.
(Supplemental Explanation of Significance of Change of Formulation)

Additionally, according to the present embodiment in which the change of the formulation is used in order to relax the constraints as needed, it is possible to avoid that the manipulated variables are unable to be determined due to a reason described below. That is to say, according to the present embodiment, by the use of formulas (45)-(50), the upper and lower limit constraints of the control variables are changed to the equality constraints from the inequality constraints shown in formulas (6)-(8). Moreover, when formula (45) is taken as an example, according to these equality constraints, a value obtained by adding, to a combination ($c_{11}x_1$+$c_{12}x_2$+$c_{13}x_3$) of the control variables, a positive excess amount ($y_4^-$) of the control variable (Tp) with respect to the constraint value (Tpmn) and by subtracting a positive margin amount ($y_4^+$) from this combination becomes equal to the constraint value (Tpmn). According to this kind of equality constraints, when a combination of the control variables is given, each equation holds regardless of the change of excess amounts (such as $y_4^-$) or margin amounts (such as $y_4^-$). Because of this, it becomes possible to avoid a situation in which there is no solution to the linear programming problem (that is, a situation in which the manipulated variables are unable to be determined).
(Minimization of Excess Amounts of Control Variables)

Moreover, by the use of the objective function f' represented by formula (44), when the constraints concerning the respective constraint values are relaxed, minimization of the individual excess amounts can be achieved in descending order of the priorities $P_4$-$P_6$ as already described. In other words, according to the manipulated variable determination section 58, the plurality of constraints can be relaxed while minimizing the excess amount with respect to the upper limit constraint value or lower limit constraint value associated with each of the plurality of constraints (second constraint) in descending order of the priority. As just described, according to the present embodiment, it is possible to avoid that the manipulated variables are unable to be determined while properly minimizing (optimizing) the excess amounts of the control variables with the priority taken into consideration.
(Setting of Priority: $P_4$-$P_6$>$P_1$-$P_3$)

Furthermore, according to the present embodiment, the priorities $P_4$-$P_6$ concerning the compliance of the individual constraint values of the control variables are set so as to become higher than the priorities $P_1$-$P_3$ concerning the achievement of the target values of the respective control variables. According to this kind of setting, it becomes possible to relax the constraints (i.e., to allow the excess of the upper or lower limit constraint value) in ascending order of the priorities $P_4$-$P_6$ when the constraints are unable to be complied with, while reducing the excess of the upper and lower limit constraint values of the respective control variables as compared to the achievement of the target values of the respective control variables. It should be noted that, according to the present embodiment, each of the constraints represented by formulas (3)-(5) corresponds to an example of the "first constraint" according to the present disclosure, and each of the constraints represented by formulas (45)-(50) corresponds to an example of the "second constraint" according to the present disclosure.

9-4. Modification Examples 9-4-1. Examples of Application of Manner of Changing Formulation to Second to Eighth Embodiments The above-described manner of changing the formulation in the ninth embodiment may be applied to the powertrain system according to the second embodiment provided with the first manipulated variable determination section 72 (see FIG. 7) and the second manipulated variable determination section 78 (see FIG. 7). In detail, with respect to the first manipulated variable determination section 72, the manner of the formulation of the objective function and constraints may be changed, for example, in a similar manner to the manipulated variable determination section 58 described in the ninth embodiment. In addition, with respect to the linear programming problem F' solved by the second manipulated variable determination section 78 in order to search for and determine the manipulated variables (only Tg and Tm), constraint formulas as follows, for example, may be used while using the objective function f' shown in formula (44). More specifically, the constraint formulas mentioned here are obtained by modifying formulas (45)-(50) such that the term of the variable $x_1$ (engine torque) on the left-hand side of each of formulas (45)-(50) are moved to the right-hand side thereof, and by substituting the predicted engine torque Te' calculated by the predicted manipulated variable calculation section 76 into each of the variables $x_1$ in these formulas.

According to the second manipulated variable determination section 78 associated with the change of the formulation made as described above, "when one or more manipulated variables are unable to be determined while complying with a plurality of constraints", the processing is performed to "determine the one or more manipulated variables while relaxing at least one of the plurality of constraints in ascending order of priority".

Moreover, according to the second manipulated variable determination section 78 associated with the change of the formulation made as described above, where "one or more first constraints concerning one or more target state quantities and one or more second constraints concerning at least one of upper limit constraint value and lower limit constraint value of one or more state quantities" are included, the setting as follows may be used. That is to say, the priority given to the second constraint may be set so as to become higher than the priority given to the first constraint.

Furthermore, according to the second manipulated variable determination section 78 associated with the change of the formulation made as described above, "in relaxing a plurality of second constraints included in a plurality of constraints when one or more manipulated variables are unable to be determined while complying with the plurality of constraints", the processing may be performed to "relax the plurality of second constraints while minimizing an excess amount with respect to the upper limit constraint value or the lower limit constraint value associated with each of the plurality of second constraints in descending order of the priority".

In addition, the above-described manner of changing the formulation may be applied to the powertrain systems according to other third to eighth embodiments.

9-4-2. Other Examples of Change of Formulation

According to formula (44) in the ninth embodiment described above, the same priority $P_4$, $P_5$ or $P_6$ is assigned to the excess amount of each of the upper and lower limit constraint values with respect to the same control variable. However, the manner of assigning the priority with respect to the excess amount of the upper and lower limit constraint values of the control variables is not limited to the example described above, and may be a manner shown by formula (52) described below, for example. That is to say, according to an objective function f" shown in formula (52), the priorities $P_4$-$P_9$ are respectively assigned to the excess amounts $y_4^-$, $y_5^+$, $y_6^-$, $y_7^+$, $y_8^-$ and $y_9^+$. As just described, the priority may be separately assigned to each of the excess amount of the upper limit constraint value and the excess amount of the lower limit constraint value with respect to the same control variable.

$$\text{Minimization: } f''=P_1(y_1^-+y_1^+)+P_2(y_2^-+y_2^+)+P_3(y_3^-+y_3^+)+P_4y_4^-+P_5y_5^++P_6y_6^-+P_7y_7^++P_8y_8^-+P_9y_9^+ \quad (52)$$

Moreover, in the example of the constraints shown by formulas (45)-(50) in the ninth embodiment, the number of each of the upper and lower constraint values of the individual control variables is one. However, the number of the upper limit constraint value or lower limit constraint value with respect to the same control variable may be two or more. In other words, two or more constraints (constraint formulas) with respect to the same upper or lower limit constraint value may be set.

To be more specific, in the example in which the number of each of the upper limit constraint value and lower limit constraint value with respect to the same control variable is two, the priority may be separately assigned with respect to each of two upper limit constraint values and two lower limit constraint values. In addition, in this example, one priority may be assigned with respect to a pair of upper and lower limit constraint values (Tpmx1 and Tpmn1) that are included in two upper limit constraint values (for example, Tpmx1 and Tpmx2) and two lower limit constraint values (for example, Tpmn1 and Tpmn2), and another one priority may be assigned with respect to another pair of upper and lower limit constraint values (Tpmx2 and Tpmn2).

Moreover, formula (53) described below specifically exemplifies a manner of assigning the priority in the latter example as just described. Furthermore, an example of the setting of the priorities $P_1$-$P_9$ in formula (53) is $P_7 > P_9 > P_8 > P_6 > P_5 > P_4 > P_1 > P_3 > P_2$. It should be noted that, in the example shown in formula (53), the driving torque Tp has two lower limit constraint values Tpmn1 and Tpmn2 (Tpmn2<Tpmn1) and two upper limit constraint values Tpmx1 and Tpmx2 (Tpmx2>Tpmx1). Moreover, the reference characters $y_4^-$ and $y_4^{'-}$ are excess amounts of the drive toque Tp with respect to the lower limit constraint values Tpmn1 and Tpmn2, respectively. The reference characters $y_5^+$ and $y_5^{'+}$ are excess amounts of the drive toque Tp with respect to the upper limit constraint values Tpmx1 and Tpmx2, respectively. This also applies to a relationship between two lower limit constraint values Win1 and Win2 of the charge/discharge amount Pchg (Win2<Win1) and two upper limit constraint values Wout1 and Wout2 thereof (Wout2>Wout1), and the excess amounts of $y_6^-$, $y_6^{'-}$, $y_7^+$ and $y_7^{'+}$. The above also applies to a relationship between two lower limit constraint values dNgmn1 and dNgmn2 of the rotational speed change rate dNg (dNgmn2<dNgmn1) and two upper limit constraint values dNgmx1 and dNgmx2 thereof (dNgmx2>dNgmx1), and the excess amounts of $y_8^-$, $y_8^{'-}$, $y_9^+$ and $y_9^{'+}$.

$$\text{Minimization: } f'''=P_1(y_1^-+y_1^+)+P_2(y_2^-+y_2^+)+P_3(y_3^-+y_3^+)+P_4(y_4^-+y_5^+)+P_5(y_6^-+y_7^+)+P_6(y_8^-+y_9^+)+P_7(y_4^{'-}+y_5^{'+})+P_8(y_6^{'-}+y_7^{'+})+P_9(y_8^{'-}+y_9^{'+}) \quad (53)$$

As exemplified so far, with regard to the manner of changing the formulation according to the ninth embodiment, the form of the objective function (evaluation function), the manner of assigning the priority, and the number of constraints (i.e., the number of upper and lower limit constraint values) can be freely determined. In addition, the gist of the above-described manner of changing the formulation is that the upper and lower limit constraint values of the control variables are handled by the equality constraints instead of the inequality constraints, and that a penalty according to the priority is given to each of excess amounts of the upper and lower limit constraint values in the objective function.

10. Tenth Embodiment

Then, a tenth embodiment according to the present disclosure and modification examples thereof will be described with reference to FIGS. 15 to 18. The present embodiment corresponds to another example of measures against the issue described in the section 9-1 regarding the ninth embodiment. However, in the present embodiment, the formulation as in the ninth embodiment is not performed. A powertrain system according to the present embodiment is different from the powertrain system 10 according to the first embodiment in that the processing described below is additionally performed.

10-1. Outline

According to the present embodiment, when the manipulated variables (Te, Tg and Tm) are unable to be determined while complying with the plurality of constraints (formulas (6)-(11)) concerning the constraint values of the control variables (Tp, Pchg and dNg), the manipulated variable determination section 58 enlarges the constraint values in sequence in ascending order of the priority (more specifically, priority order, for example). It should be noted that, concerning upper limit constraints, the phrase "enlarging the constraint values" mentioned here means increasing the value thereof and that, concerning lower limit constraints, it means decreasing the value thereof.

According to the present embodiment, when, no matter how the manipulated variables (Te, Tg and Tm) are controlled, the plurality of constraints concerning the constraint values of the control variables cannot be complied with, the enlargement of the constraint values as described above are used to determine the manipulated variables while relaxing one of the plurality of constraints in ascending priority order.

10-2. Processing by Control Device

Figure 15:
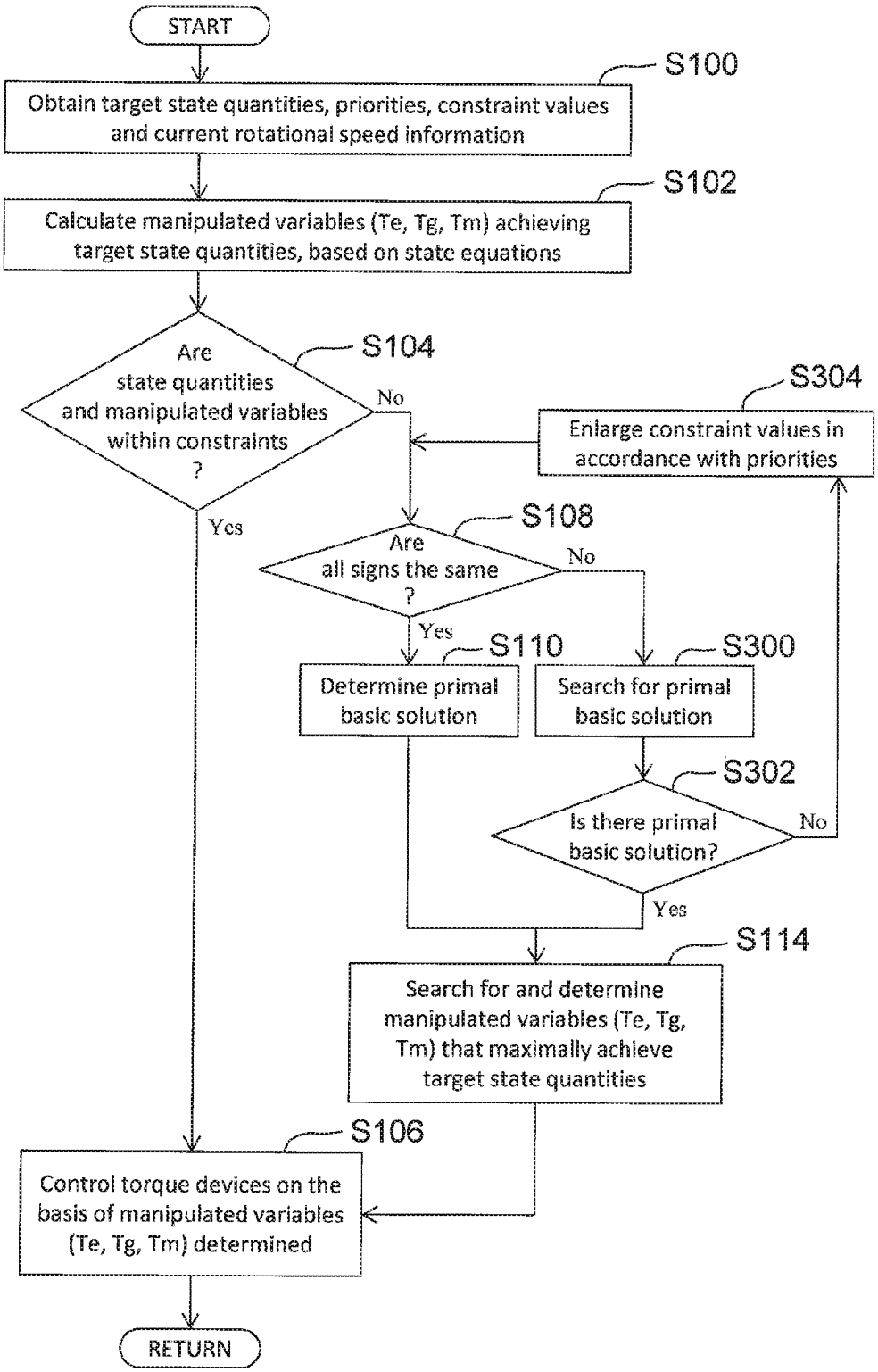
FIG. 15 is a flow chart that illustrates a routine of the processing concerning a torque device control according to a tenth embodiment of the present disclosure.

FIG. 15 is a flow chart that illustrates a routine of the processing concerning a torque device control according to the tenth embodiment of the present disclosure. It should be noted that the processing of steps S100 to S110 and S114 in the routine shown in FIG. 15 is as already described in the first embodiment.

If the determination result of step S108 is negative, the processing of the routine shown in FIG. 15 proceeds to step S300. In step S300, the control device 50 (manipulated variable determination section 58) searches for a primal basic solution using a similar processing to step S112.

Then, in step S302, the manipulated variable determination section 58 determines whether or not there is a primal basic solution. This determination is performed on the basis of whether or not the value of the objective function z (see formula (32) in the first embodiment) becomes zero (that is, whether or not all of the artificial variables $t_i$ become zero). If, as a result, the determination result of step S302 is positive (that is, if the value of the objective function z becomes zero), the primal basic solution is obtained and then, the processing proceeds to step S114.

If, on the other hand, the determination result of step S302 is negative (that is, if the value of the objective function z does not become zero), it is determined that there is no primal basic solution (i.e., there is no feasible solution that satisfies the constraints). Thereafter, the processing proceeds to step S304.

It is assumed that the priority orders (priorities) $P_4$-$P_9$ are respectively given to the constraint values (upper and lower limit constraint values Tpmn, Tpmx, Win, Wout, dNgmn and dNgmx) of the control variables (Tp, Pchg and dNg). The priority orders $P_4$-$P_9$ can be freely set as described in the ninth embodiment. In step S304, the manipulated variable determination section 58 enlarges the constraint values in accordance with the priority orders $P_4$-$P_9$ (more specifically, in ascending order of the priority orders $P_4$-$P_9$). It should be noted that the processing of step S304 is repeatedly performed as needed, until the determination result of step S302 becomes positive.

Figure 16:
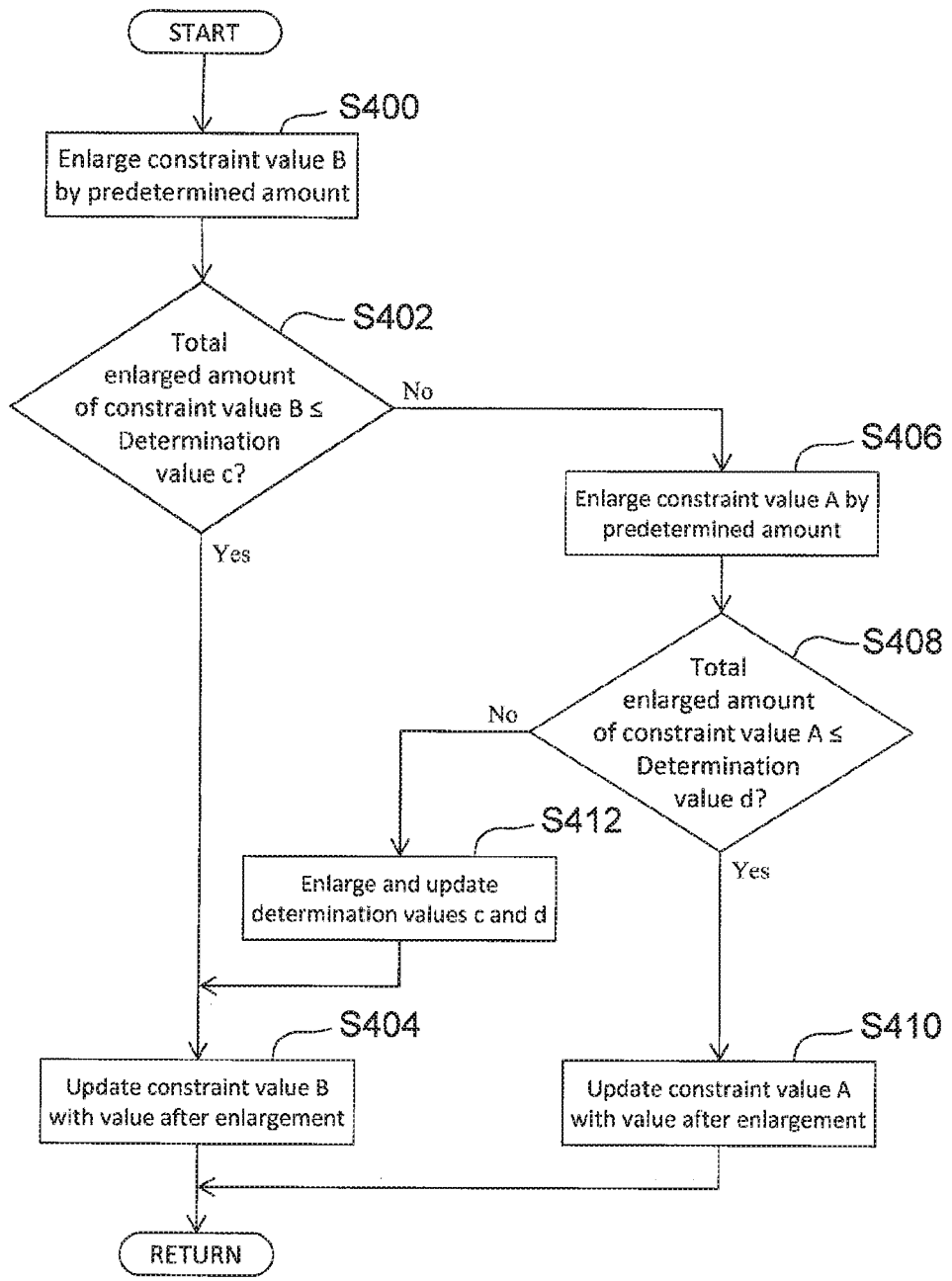
FIG. 16 is a flow chart that illustrates a routine concerning an example of the manner of enlarging constraint values used in the processing of step S304.

FIG. 16 is a flow chart that illustrates a routine concerning an example of the manner of enlarging the constraint values used in the processing of step S304. Although the number of the constraint values of the control variables used in the present embodiment is six as described above, the manner of enlarging the constraint values are herein described using an example in which only two constraint values A and B are used and the priority order of the constraint value A is higher than that of the constraint value B, for ease of explanation.

According to the routine shown in FIG. 16, first, in step S400 the manipulated variable determination section 58 enlarges the constraint value B having a relatively low priority order by a desired predetermined amount. Then, in step S402, the manipulated variable determination section 58 determines whether or not the total enlargement amount of the constraint value B is less than or equal to a determination value c. The total enlargement amount of the constraint value B mentioned here corresponds to, for example, a difference of the current constraint value B with respect to a constraint value B (initial value) at the time of starting the processing of the present routine. Alternatively, this total enlargement amount may be reset to zero when the determination value c is updated by the processing of step S412 described below.

If the determination result of step S402 is positive (total enlargement amount of constraint value B<determination value c), the processing proceeds to step S404. In step S404, the manipulated variable determination section 58 updates the constraint value B with a value after the enlargement by the processing of step S400. Thereafter, the current processing cycle is ended.

If, on the other hand, the determination result of step S402 is negative, that is, if the total enlargement value of the constraint value B has exceeded the determination value c (total enlargement amount of constraint value B>determination value c), the processing proceeds to step S406. In step S406, the manipulated variable determination section 58 enlarges the constraint value A having a relatively high priority order by a desired predetermined amount, instead of the constraint value B. Then, in step S408, the manipulated variable determination section 58 determines whether or not the total enlargement amount of the constraint value A is less than or equal to a determination value d. The determination processing of step S408 is based on a similarly manner to step S402. However, the determination value d may be the same as, or different from the determination value c.

If the determination result of step S408 is positive (total enlargement amount of constraint value A≤determination value d), the processing proceeds to step S410. In step S410, the manipulated variable determination section 58 updates the constraint value A with a value after the enlargement by the processing of step S406. Thereafter, the current processing cycle is ended. It should be noted that, with regard to the constraint value B, if the processing proceeds to step S410 in this way, the update of the constraint value B using a value after the enlargement by the processing of step S400 is not performed.

If, on the other hand, the determination result of step S408 is negative (total enlargement amount of constraint value A>determination value d), that is, if not only the total enlargement amount of the constraint value B exceeds the determination value c but also the total enlargement amount of the constraint value A exceeds the determination value d, the processing proceeds to step S412. In step S412, the manipulated variable determination section 58 enlarges each of the determination values c and d by the corresponding predetermined amount to update these determination values c and d. It should be noted that the determination values c and d may be enlarged by the same predetermined amount or by the respective predetermined amounts that are different from each other. After the processing of step S412, the processing proceeds to step S404. That is to say, after the processing proceeds to step S404 via steps S408 and S412 in this way, the update of the constraint value B using a value after the enlargement by the processing of step S400 is restarted.

10-3. Effects

According to the above-described manner of enlarging the constraint values shown in FIG. 16, first, the constraint value B having a relatively low priority order is gradually increased. If, as a result, the constraint value B has exceeded the determination value c, then the constraint value A having a relatively high priority order is gradually increased. If, as a result, the constraint value A has exceeded the determination value d, the determination values c and d are enlarged. Thereafter, the constraint value B is gradually increased again until it exceeds an enlarged constraint value c. The same applies hereinafter.

As described above, according to the present manner of the enlargement, when it is determined in step S302 that there is no primal basic solution (i.e., that the manipulated variables are unable to be determined while complying with the plurality of constraints), the constraint values can be enlarged in sequence in ascending priority order. In addition, the present manner of the enlargement is expansively applicable to an example of three or more constraint values, instead of the example of two constraint values A and B. Because of this, it can be found that, if, for example, the present manner of the enlargement is expansively applied, the constraint values can be enlarged in sequence in ascending order of the priority orders $P_4$-$P_9$ for six constraint values (for example, Tpmn) used in step S304 of the present embodiment.

As described so far, according to the present embodiment, when six constraint values, such as Tpmn (i.e., the plurality of constraints) cannot be complied with, the manipulated variables (Te, Tg and Tm) can be determined while enlarging the constraint values in sequence in ascending order of the priority orders $P_4$-$P_9$ (i.e., while relaxing one of the plurality of constraints in sequence). Because of this, according to the present embodiment, again, by relaxing the constraints in this way as needed, it is possible to avoid that the manipulated variables are unable to be determined.

Additionally, according to the manner of enlarging the constraint values shown in FIG. 16, the individual constraint values are gradually enlarged in ascending priority order. Because of this, it becomes possible to avoid that the manipulated variables are unable to be determined while reducing, to the minimum, the excess amounts of the control variables with respect to the respective constraint values.

(Specific Example of Changes in Constraint Values)

Figure 17:
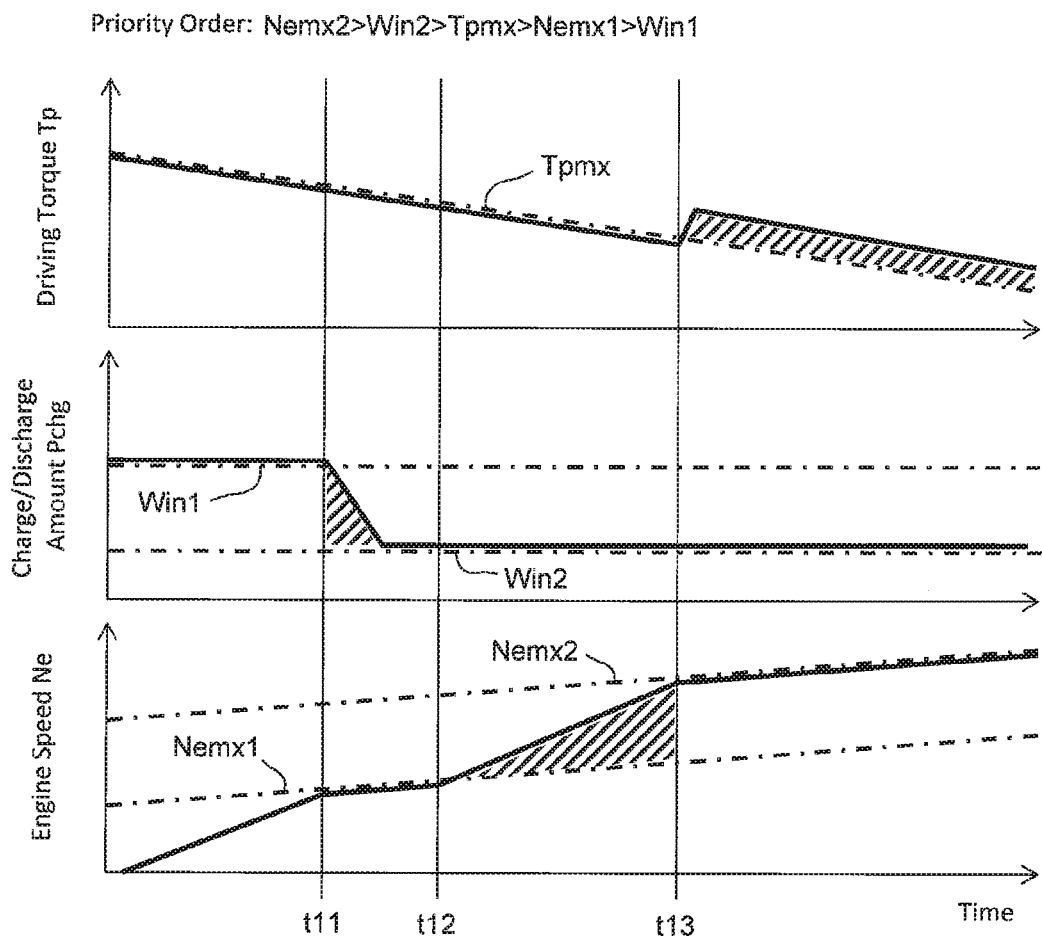
FIG. 17 is a time chart that illustrates an example of changes in constraint values of the respective control variables by the manner of enlargement shown in FIG. 16.

Then, with reference to FIG. 17, an example of changes in constraint values by the manner of enlargement shown by FIG. 16 is supplementally described. FIG. 17 is a time chart that illustrates an example of changes in constraint values of the respective control variables by the manner of enlargement shown in FIG. 16.

The control variables used in the example shown in FIG. 17 are the driving torque Tp, the charge/discharge amount Pchg and the engine speed Ne, in contrast to the powertrain system 10. Moreover, the constraint values of the control variables used in this example are five values, that is, the upper limit constraint value Tpmx of the driving torque Tp, two lower limit constraint values Win1 and Win2 of the charge/discharge amount Pchg (Win2<Win1), and two upper limit constraint values Nemx1 and Nemx2 of the engine speed Ne (Nemx2>Nemx1). An example of the setting of the priority orders of the constraint values in this example is Nemx2>Win2>Tpmx>Nemx1>Win1. It should be noted that, in FIG. 17, all of the constraint values are represented by one-dot chain lines, and solid lines correspond to actual values of the respective control variables.

FIG. 17 represents an example of changes in the constraint values at the time of continuous downhill in which the hybrid vehicle (see FIG. 1) is going down a slope. When the hybrid vehicle is going down a slope in this manner, depression of the accelerator pedal is released and a high vehicle braking force is requested to the hybrid vehicle. In response to this request, according to the example shown in FIG. 17, the upper limit constraint value Tpmx of the driving torque Tp decreases with a lapse of time. In order to achieve a high vehicle braking force, it is effective to increase an engine braking force by increasing the engine speed Ne and to increase a regenerative braking force by increasing a negative torque of the MG2 32. Accordingly, in this example, the manipulated variable determination section 58 determines the manipulated variables (Te, Tg and Tm) such that the engine speed Ne becomes higher and the charge/discharge amount Pchg approaches the lower limit constraint value Win1 to perform a regenerative power generation while controlling the driving torque Tp in the vicinity of the upper limit constraint value Tpmx that decreases as described above.

On that basis, at a time point t11 during the continuous downhill running, the engine speed Ne is reached to the upper limit constraint value Nemx1 under the condition that the driving torque Tp approaches the upper limit constraint value Tpmx and that the charge/discharge amount Pchg approaches the lower limit constraint value Win1. If the engine speed Ne exceeds the upper limit constraint value Nemx1, the manipulated variable can no longer be determined. Therefore, according to this control example, in association with a lapse of the time point t11, the lower limit constraint value Win1 whose priority order is the lowest is enlarged to the lower limit constraint value Win2. As a result, the manipulated variables can be continuously determined while complying with the upper limit constraint value Tpmx and the upper limit constraint value Tpmx.

A time point t12 thereafter corresponds to a time point at which, even if the lower limit constraint value Win is lowered to the lower limit constraint value Win2, both of the upper limit constraint value Tpmx and the upper limit constraint value Nemx1 are no longer complied with. According to this control example, in association with a lapse of the time point t12, the upper limit constraint value Nemx1 having a priority order lowest next to the upper limit constraint value Win1 is enlarged to the upper limit constraint value Nemx2. As a result, the manipulated variables can be continuously determined while complying with the upper limit constraint value Tpmx and the lower limit constraint value Win2.

At a time point t13 thereafter, the engine speed Ne is reached to the upper limit constraint value Nemx2 in a situation in which the driving torque Tp approaches the upper limit constraint value Tpmx and the charge/discharge amount Pchg approaches the lower limit constraint value Win2. If the engine speed Ne exceeds the upper limit constraint value Nemx2, the manipulated variables can no longer be determined. Therefore, according to this control example, in association with a lapse of the time point t13, the upper limit constraint value Tpmx having a priority order lowest next to the upper limit constraint value Nemx1 is enlarged by a predetermined amount. As a result, according to the example of continuous downhill running shown in FIG. 17, the manipulated variables can be continuously determined such that a desired vehicle braking force is obtained while complying with the upper limit constraint value Nemx2 and the lower limit constraint value Win2.

As can be seen from the control example shown in FIG. 17 described above, according to the measures in the tenth embodiment, the constraint values are gradually enlarged in ascending priority order. Because of this, as already described, it becomes possible to avoid that the manipulated variables are unable to be determined while reducing, to the minimum, the excess amounts of the control variables with respect to the respective constraint values. In addition, it is possible to avoid that the manipulated variables are unable to be determined while emphasizing the compliance of the constraint values having relatively high priorities (in the example shown in FIG. 17, the upper limit constraint value Nemx2 and the lower limit constraint value Win2).

10-4. Modification Examples 10-4-1. Other Examples of Manner of Enlarging Constraint Values According to the processing of the routine shown in FIG. 16, the constraint values are enlarged one by one in ascending priority order (that is, one of the plurality of constraints is relaxed at a time). However, instead of this kind of example, two or more constraint values may be enlarged at the same time in ascending priority order (that is, two or more constraints may be relaxed at the same time). To be more specific, for example, an upper limit constraint value and a lower limit constraint value for the same control variable may be enlarged at the same time. A manner described below with reference to FIG. 18 corresponds to an example of the manner of enlarging two or more constraint values at the same time by an enlarged amount different depending on the priority order (priority).

Figure 18:
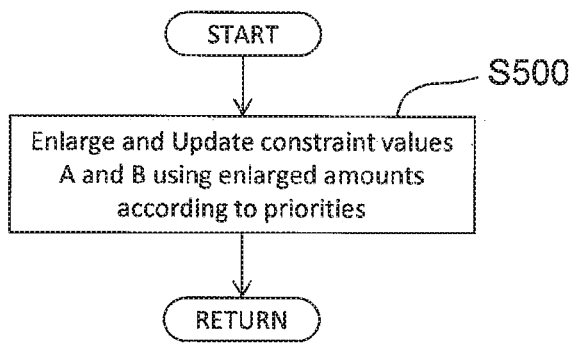
FIG. 18 is a flow chart that illustrates a routine concerning another example of the manner of enlarging the constraint values used in the processing of step S304.

FIG. 18 is a flow chart that illustrates a routine concerning another example of the manner of enlarging the constraint values used in the processing of step S304. Similarly to the example shown in FIG. 16, FIG. 18 is also associated with an example in which only two constraint values A and B are used and the priority order of the constraint value A is higher than that of the constraint value B, for ease of explanation.

According to the routine shown in FIG. 18, the manipulated variable determination section 58 executes the processing of step S500. In step S500, the constraint values A and B are enlarged by enlarged amounts different depending on the priorities (for example, priority orders), and the constraint values A and B are updated by the values after the enlargement. In detail, in step S500, the enlarged amount of the constraint value A having a relatively high priority is smaller than the enlarged amount of the constraint value B having a relatively low priority. In this manner, a plurality of constraint values may be enlarged at the same time while making a difference between the enlarged amounts in accordance with the priorities. Moreover, according to this kind of manner, similarly to the ninth embodiment, it is possible to perform "the processing to relax the plurality of second constraints while minimizing an excess amount with respect to the upper limit constraint value or the lower limit constraint value associated with each of the plurality of second constraints in descending order of the priority". It should be noted that, in contrast to the example shown in FIG. 18, the enlarged amounts of a plurality of constraint values that are enlarged at the same time may be the same as each other.

Additionally, the manner shown in FIG. 16 and the manner shown in FIG. 18 may be combined with each other. In order to provide a specific explanation of this kind of combination, an example is given in which four constraint values A, B, C and D are used and the priorities of these constraint values are set as C>D>A>B. In this example, first, the enlarged amount of the constraint value A may be smaller than that of the constraint value B, and the enlarged amount of the constraint value C may be smaller than that of the constraint value D. In addition, similarly to the manner of the routine shown in FIG. 16, the set of the constraint values A and B having relatively low priorities may be enlarged prior to the set of the constraint values C and D.

10-4-2. Example of Application to Powertrain System According to Second Embodiment Each of the manner of enlarging the constraint values according to the routines shown in FIGS. 15 and 16 and the manner of enlarging the constraint values described in the section 10-4-1 may be combined with the routine shown in FIG. 8 (second embodiment) using the first and second manipulated variable determination sections 72 and 78, instead of the routine shown in FIG. 3 (first embodiment).

11. Other Embodiments

According to the "manipulated variable determination section 58", the "first manipulated variable determination section 72" and the "second manipulated variable determination section 78" in the above-described embodiments, such as the first and second embodiments, in order to determine optimal manipulated variables of the torque devices, the priorities $P_1$-$P_3$ are respectively set for a plurality of target state quantities. However, the "first and second manipulated variable determination sections" according to the present disclosure may not always be limited to the example in which the priority is used. Because of this, at least one of the manipulated variable determination section 58, the first manipulated variable determination section 72 and the second manipulated variable determination section 78 may determine manipulated variables that achieve a plurality of target state quantities to the maximum extent possible without setting the priority. To be more specific, in an example in which the priority is not set, a solution to minimize, under constraints, an objective function f'''' that does not include the priorities $P_1$-$P_3$ as shown in the following formula (54) may be calculated while performing a predetermined normalization with respect to a plurality of control variables (target state quantities). The normalization referred to here can be performed, for example, by setting the maximum values of the respective control variables to 1 and setting the minimum values thereof to 0.

$$\text{Minimization: } f'''' = (y_1^- + y_1^+) + (y_2^- + y_2^+) + (y_3^- + y_3^+) \tag{54}$$

Furthermore, according to the ninth and tenth embodiments, the priorities, such as $P_4$-$P_6$, are set for the plurality of constraint values (the plurality of constraints) of the control variables (state quantities to be controlled). However, similarly to the example of the target state quantities described above, the "first and second manipulated variable determination sections" according to the present disclosure may not always be limited to the example in which the priority is given to a plurality of constraints (which correspond to a "plurality of second constrains") concerning at least one of upper limit constraint value and lower limit constraint value of one or more state quantities. In addition, the number of constraints used in a powertrain system according to the present disclosure may be one, instead of the above-described examples of using a plurality of constraints.

The embodiments and modification examples described above may be combined in other ways than those explicitly described above as required and may be modified in various ways without departing from the scope of the present disclosure.

What is claimed is:

1. A powertrain system, comprising:
one or more torque devices associated with control of a driving force of a vehicle, the one or more torque devices includes a first torque device and a second torque device having a greater output response delay compared to the first torque device; and
an electronic control unit configured to control the one or more torque devices, the electronic control unit is configured to:
solve a linear programming problem to determine, based on one or more linear state equations that define a relationship between one or more state quantities controlled by the powertrain system and one or more manipulated variables of the one or more torque devices, the one or more manipulated variables such that one or more target state quantities being one or more target values of the one or more state quantities are maximally achieved within one or more constraints of the powertrain system;
calculate a predicted manipulated variable of the second torque device that is obtained by reflecting an output response delay of the second torque device into a determined manipulated variable of the second torque device;
solve the linear programming problem to determine, based on the one or more linear state equations in which the predicted manipulated variable is substituted as the manipulated variable of the second torque device, a manipulated variable of the first torque device that maximally achieves the one or more target state quantities within the one or more constraints; and
control the second torque device in accordance with the determined manipulated variable of the second torque device, and control the first torque device in accordance with the determined manipulated variable of the first torque device.

2. The powertrain system according to claim 1,
wherein the one or more target state quantities include a plurality of target state quantities, and
wherein the electronic control unit is further configured to solve the linear programming problem to determine, within the one or more constraints, the one or more manipulated variables that maximally achieve each of the plurality of target state quantities in descending order of priority.

3. The powertrain system according to claim 1,
wherein the one or more target state quantities include a plurality of target state quantities, and
wherein the electronic control unit solves the linear programming problem to determine, within the one or more constraints, the manipulated variable of the first torque device that maximally achieves each of the plurality of target state quantities in descending order of priority.

4. The powertrain system according to claim 1,
wherein the one or more constraints include a plurality of constraints concerning the one or more state quantities, and
wherein when the one or more manipulated variables are unable to be determined while complying with the plurality of constraints, the electronic control unit determines the one or more manipulated variables while relaxing at least one of the plurality of constraints in ascending order of priority.

5. The powertrain system according to claim 4,
wherein the plurality of constraints include:
one or more first constraints concerning the one or more target state quantities; and
one or more second constraints concerning at least one of upper limit constraint value and lower limit constraint value of the one or more state quantities, and
wherein the priority given to the one or more second constraints is higher than the priority given to the one or more first constraints.

6. The powertrain system according to claim 4,
wherein the plurality of constraints include a plurality of second constraints concerning at least one of upper limit constraint value and lower limit constraint value of the one or more state quantities, and
wherein, in relaxing the plurality of second constraints when the one or more manipulated variables are unable to be determined while complying with the plurality of constraints, the electronic control unit relaxes the plurality of second constraints while minimizing an excess amount with respect to the upper limit constraint value or the lower limit constraint value associated with each of the plurality of second constraints in descending order of the priority.

7. The powertrain system according to claim 1,
wherein the one or more constraints include a plurality of constraints concerning the one or more state quantities, and
wherein when the one or more manipulated variables are unable to be determined while complying with the plurality of constraints, the electronic control unit determines the one or more manipulated variables while relaxing at least one of the plurality of constraints in ascending order of priority.

8. The powertrain system according to claim 7,
wherein the plurality of constraints include:
one or more first constraints concerning the one or more target state quantities; and
one or more second constraints concerning at least one of upper limit constraint value and lower limit constraint value of the one or more state quantities, and
wherein the priority given to the one or more second constraints is higher than the priority given to the one or more first constraints.

9. The powertrain system according to claim 7,
wherein the plurality of constraints include a plurality of second constraints concerning at least one of upper limit constraint value and lower limit constraint value of the one or more state quantities, and
wherein, in relaxing the plurality of second constraints when the one or more manipulated variables are unable to be determined while complying with the plurality of constraints, the electronic control unit relaxes the plurality of second constraints while minimizing an excess amount with respect to the upper limit constraint value or lower limit constraint value corresponding to each of the plurality of second constraints in descending order of the priority.

10. A powertrain system, comprising:
one or more torque devices associated with control of a driving force of a vehicle; and
an electronic control unit configured to control the one or more torque devices, the electronic control unit is configured to:
solve a linear programming problem to determine, based on one or more linear state equations that define a relationship between one or more state quantities controlled by the powertrain system and one or more manipulated variables of the one or more torque devices, the one or more manipulated variables such that one or more target state quantities being one or more target values of the one or more state quantities are maximally achieved within a plurality of constraints concerning the one or more state quantities of the powertrain system; and
control the one or more torque devices in accordance with the determined one or more manipulated variables;
wherein the one or more constraints include a plurality of constraints concerning the one or more state quantities;
wherein when the one or more manipulated variables are unable to be determined while complying with the plurality of constraints, the electronic control unit determines the one or more manipulated variables while relaxing at least one of the plurality of constraints in ascending order of priority;
wherein the plurality of constraints include:
one or more first constraints concerning the one or more target state quantities;
one or more second constraints concerning at least one of upper limit constraint value and lower limit constraint value of the one or more state quantities; and
wherein the priority given to the one or more second constraints is higher than the priority given to the one or more first constraints.

\* \* \* \* \*